US008194588B2

(12) United States Patent
Park et al.

(10) Patent No.: US 8,194,588 B2
(45) Date of Patent: *Jun. 5, 2012

(54) CODING BLOCK BASED HARQ COMBINING SCHEME FOR OFDMA SYSTEMS

(75) Inventors: Jong Hyeon Park, San Jose, CA (US); Bok Tae Sim, San Ramon, CA (US); Je Woo Kim, Cupertino, CA (US); Serguei A. Glazko, San Diego, CA (US); Sameer Nanavati, Fremont, CA (US); James Y. Hurt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 894 days.

This patent is subject to a terminal disclaimer.

(21) Appl. No.: 11/955,645

(22) Filed: Dec. 13, 2007

(65) Prior Publication Data

US 2009/0154392 A1 Jun. 18, 2009

(51) Int. Cl.
*H04W 4/00* (2009.01)
(52) U.S. Cl. .................. 370/328; 370/252
(58) Field of Classification Search .................. None
See application file for complete search history.

(56) References Cited

U.S. PATENT DOCUMENTS

| | | | | |
|---|---|---|---|---|
| 6,671,849 | B2 * | 12/2003 | Tripathi et al. | 714/746 |
| 2002/0159384 | A1 * | 10/2002 | Classon et al. | 370/216 |
| 2003/0043764 | A1 * | 3/2003 | Kim et al. | 370/329 |
| 2003/0072292 | A1 * | 4/2003 | Yoon et al. | 370/342 |
| 2003/0076870 | A1 * | 4/2003 | Moon et al. | 375/130 |
| 2003/0081576 | A1 * | 5/2003 | Kim et al. | 370/335 |
| 2003/0097629 | A1 * | 5/2003 | Moon et al. | 714/751 |
| 2003/0147371 | A1 * | 8/2003 | Choi et al. | 370/341 |
| 2005/0053168 | A1 * | 3/2005 | Song et al. | 375/261 |
| 2005/0166129 | A1 * | 7/2005 | Yano et al. | 714/797 |
| 2007/0038922 | A1 * | 2/2007 | Kim et al. | 714/776 |
| 2007/0250751 | A1 * | 10/2007 | Cai et al. | 714/748 |
| 2008/0002629 | A1 * | 1/2008 | Roh et al. | 370/335 |
| 2008/0046793 | A1 * | 2/2008 | Heo et al. | 714/748 |
| 2008/0065944 | A1 * | 3/2008 | Seol et al. | 714/748 |
| 2008/0081651 | A1 * | 4/2008 | Kuroda et al. | 455/509 |

(Continued)

FOREIGN PATENT DOCUMENTS

EP 1496638 1/2005

(Continued)

OTHER PUBLICATIONS

International Search Report—PCT/US08/052722—International Search Authority, European Patent Office—Oct. 7, 2008.

(Continued)

*Primary Examiner* — Bunjob Jaroenchonwanit
(74) *Attorney, Agent, or Firm* — Charles Chesney

(57) ABSTRACT

A method and apparatus for combining retransmitted hybrid automatic repeat-request (HARQ) messages divided into coding blocks in an orthogonal frequency-division multiplexing (OFDM)/orthogonal frequency-division multiple access (OFDMA) receiver are provided. According to such a coding-block-based HARQ combining scheme, the quality of each coding block may be compared to a threshold to determine whether the decoded bits or the HARQ combined signal should be saved for each coding block for subsequent HARQ iterations. In addition to reducing the required HARQ buffer size while preserving the combining gain, coding-block-based HARQ combining may also provide fast decoding and reduced power consumption when compared to conventional HARQ combining techniques.

22 Claims, 21 Drawing Sheets

U.S. PATENT DOCUMENTS

| | | | |
|---|---|---|---|
| 2008/0151831 A1* | 6/2008 | Khan et al. | 370/330 |
| 2008/0159537 A1* | 7/2008 | Khan et al. | 380/268 |
| 2009/0228755 A1* | 9/2009 | Franovici | 714/751 |
| 2010/0067459 A1* | 3/2010 | Goransson et al. | 370/329 |

FOREIGN PATENT DOCUMENTS

| | | |
|---|---|---|
| EP | 1499058 | 1/2005 |
| EP | 1628428 | 2/2006 |
| RU | 2234806 | 8/2004 |
| WO | WO9831106 | 7/1998 |
| WO | 2007078219 | 7/2007 |

OTHER PUBLICATIONS

Written Opinion—PCT/US08/052722—International Search Authority, European Patent Office—Oct. 7, 2008.

Taiwan Search Report—TW097104270—TIPO—Jul. 12, 2011.

* cited by examiner

FIG. 14

CODING BLOCK BASED HARQ COMBINING SCHEME FOR OFDMA SYSTEMS

TECHNICAL FIELD

Embodiments of the present disclosure generally relate to data communication and, more particularly, to hybrid automatic repeat-request (HARQ) combining schemes for wireless communication.

BACKGROUND

To improve the reliability of data transmission, some wireless systems employ a HARQ scheme where error detection (ED) bits and forward error correction (FEC) bits are added to transmissions. A receiver can use these ED and FEC bits to determine whether or not a packet was decoded properly. If not, the receiver may signal the transmitter via a negative acknowledgment (NAK), prompting the transmitter to retransmit the packet.

In some applications, Chase combining may be employed, where incorrectly received coded data blocks are stored at the receiver (in a HARQ buffer) rather than discarded. When the retransmitted block is received, the retransmitted block is combined with the previously received block, which can increase the probability of successful decoding. Different types of combining techniques may have an impact on bit error rate performance and the required buffer size, depending on transmission parameters. Unfortunately, transmission parameters often change, especially between wireless channels, such that the type of combining scheme implemented in a receiver is not always optimal.

SUMMARY

Embodiments of the present disclosure generally relate to examining the quality of decoded data for each coding block of a hybrid automatic repeat-request (HARQ) message to determine whether the HARQ combined signal data or the decoded data should be saved for subsequent HARQ transmissions in a receiver for wireless communication.

Certain embodiments of the present disclosure provide a receiver for wireless communication with a HARQ mechanism. The receiver generally includes at least one buffer for storing data for a previously received HARQ transmission divided into a plurality of coding blocks and having an incorrect decoded message, the data for each of the plurality of coding blocks being HARQ combined signal data or decoded bits; at least one combiner configured to generate the HARQ combined signal data for each coding block based on signal data for a current HARQ transmission and signal data for the previously received HARQ transmission; a decoder configured to produce the decoded bits for each coding block based on the HARQ combined signal data; and control logic configured to select between saving the HARQ combined signal data or the decoded bits for each coding block to the at least one buffer based on a selection criterion.

Certain embodiments of the present disclosure provide an apparatus for wireless communication with a HARQ mechanism. The apparatus generally includes means for storing data for a previously received HARQ transmission divided into a plurality of coding blocks and having an incorrect decoded message, the data for each of the plurality of coding blocks being HARQ combined signal data or decoded data; first means for generating the HARQ combined signal data for each coding block at a first location along a reception processing path, the HARQ combined signal data based on signal data for a current HARQ transmission and signal data for the previously received HARQ transmission; means for producing the decoded data for each coding block based on the HARQ combined signal data; and means for selecting between storing the HARQ combined signal data or the decoded data for each coding block to the means for storing data based on a selection criterion.

Certain embodiments of the present disclosure provide a processor for wireless communication with a HARQ mechanism. Operations executed on the processor generally include receiving a current HARQ transmission having a plurality of coding blocks; generating HARQ combined signal data for each coding block based on signal data for the current HARQ transmission and signal data for a previously received HARQ transmission having an incorrect decoded message; decoding the HARQ combined signal data for each coding block; and for each coding block, saving either the HARQ combined signal data or the decoded data based on a selection criterion.

Certain embodiments of the present disclosure provide a computer-program product for wireless communication with a HARQ mechanism. The computer-program product generally includes instructions for storing data for a previously received HARQ transmission divided into a plurality of coding blocks and having an incorrect decoded message, the data for each of the plurality of coding blocks being HARQ combined signal data or decoded data; first instructions for generating the HARQ combined signal data for each coding block at a first location along a reception processing path, the HARQ combined signal data based on signal data for a current HARQ transmission and signal data for the previously received HARQ transmission; instructions for producing the decoded data for each coding block based on the HARQ combined signal data; and instructions for selecting between storing the HARQ combined signal data or the decoded data for each coding block to the instructions for storing data based on a selection criterion.

Certain embodiments of the present disclosure provide a mobile device. The mobile device generally includes a receiver front end for receiving a current HARQ transmission; at least one buffer for storing data for a previously received HARQ transmission divided into a plurality of coding blocks and having an incorrect decoded message, the data for each of the plurality of coding blocks being HARQ combined signal data or decoded bits; at least one combiner configured to generate the HARQ combined signal data for each coding block based on signal data for the current and the previously received HARQ transmissions; a decoder configured to produce the decoded bits for each coding block based on the HARQ combined signal data; and control logic configured to select between saving the HARQ combined signal data or the decoded bits for each coding block to the at least one buffer based on a selection criterion.

Certain embodiments of the present disclosure are methods for interpreting HARQ transmissions in a wireless communication system. The method generally includes receiving a current HARQ transmission having a plurality of coding blocks; generating HARQ combined signal data for each coding block based on signal data for the current HARQ transmission and signal data for a previously received HARQ transmission having an incorrect decoded message; decoding the HARQ combined signal data for each coding block; and for each coding block, saving either the HARQ combined signal data or the decoded data based on a selection criterion.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 14 illustrates contents of the HARQ buffer during example iterations of coding-block-based HARQ combining, in accordance with certain embodiments of the present disclosure.

DETAILED DESCRIPTION

Figure 1:
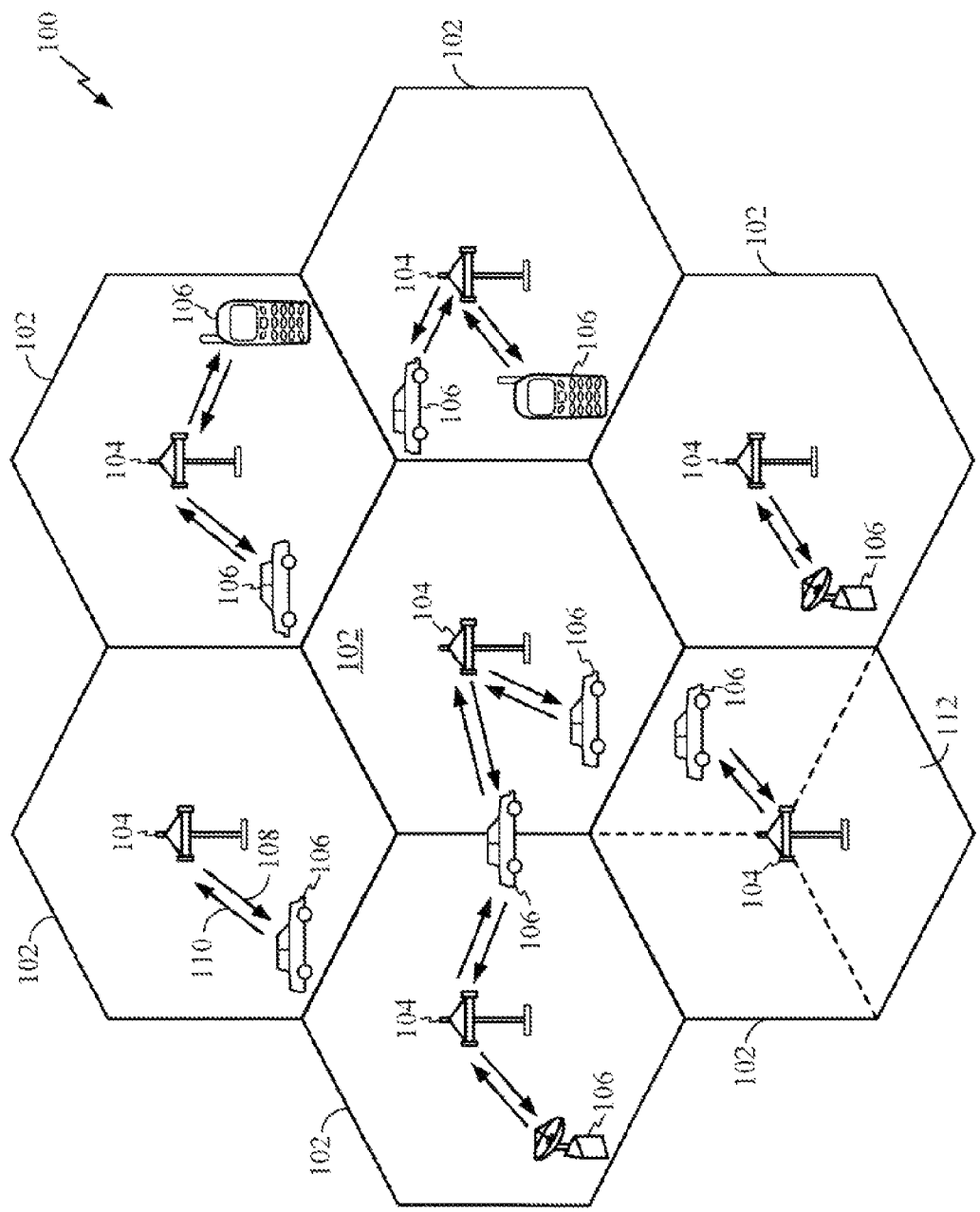
FIG. 1 illustrates an example wireless communication system, in accordance with certain embodiments of the present disclosure.

Embodiments of the present disclosure provide techniques and systems for selecting between different types of combiners within a receiver for combining transmitted/retransmitted hybrid automatic repeat-request (HARQ) messages. For some embodiments, a combination of different types of HARQ combiners may be designed into a receiver (at different processing stages) and selected on a per-channel basis.

The type of combiner selected for use with a particular channel at any given time may depend on a number of selection criteria, such as the modulation order of the transmitted signal, the number of bits needed for the combined signals, and the amount of space remaining (headroom) in the HARQ buffer. Proper selection of a HARQ combining scheme may reduce the required HARQ buffer size and may result in an increased combining gain when compared to conventional HARQ combining techniques utilizing a single combiner.

The following description presents certain embodiments of selective HARQ (S-HARQ) combining that utilize Chase combining as a particular, but not limiting, scheme. In Chase combining, the retransmissions are copies of the original transmission. However, those skilled in the art will recognize that the concepts of selective combining described herein may be used to similar advantage with other combining schemes, such as incremental redundancy (IR), where the retransmissions comprise new parity bits from the channel encoder.

An Exemplary Wireless Communication System

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate sub-streams. Each sub-stream is modulated with one of multiple orthogonal sub-carriers and sent over one of a plurality of parallel sub-channels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. IEEE 802.16x approved "IEEE P802.16-REVd/D5-2004" in May 2004 for fixed BWA systems and published "IEEE P802.16e/D12 Oct. 2005" in October 2005 for mobile BWA systems. Those two standards defined four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
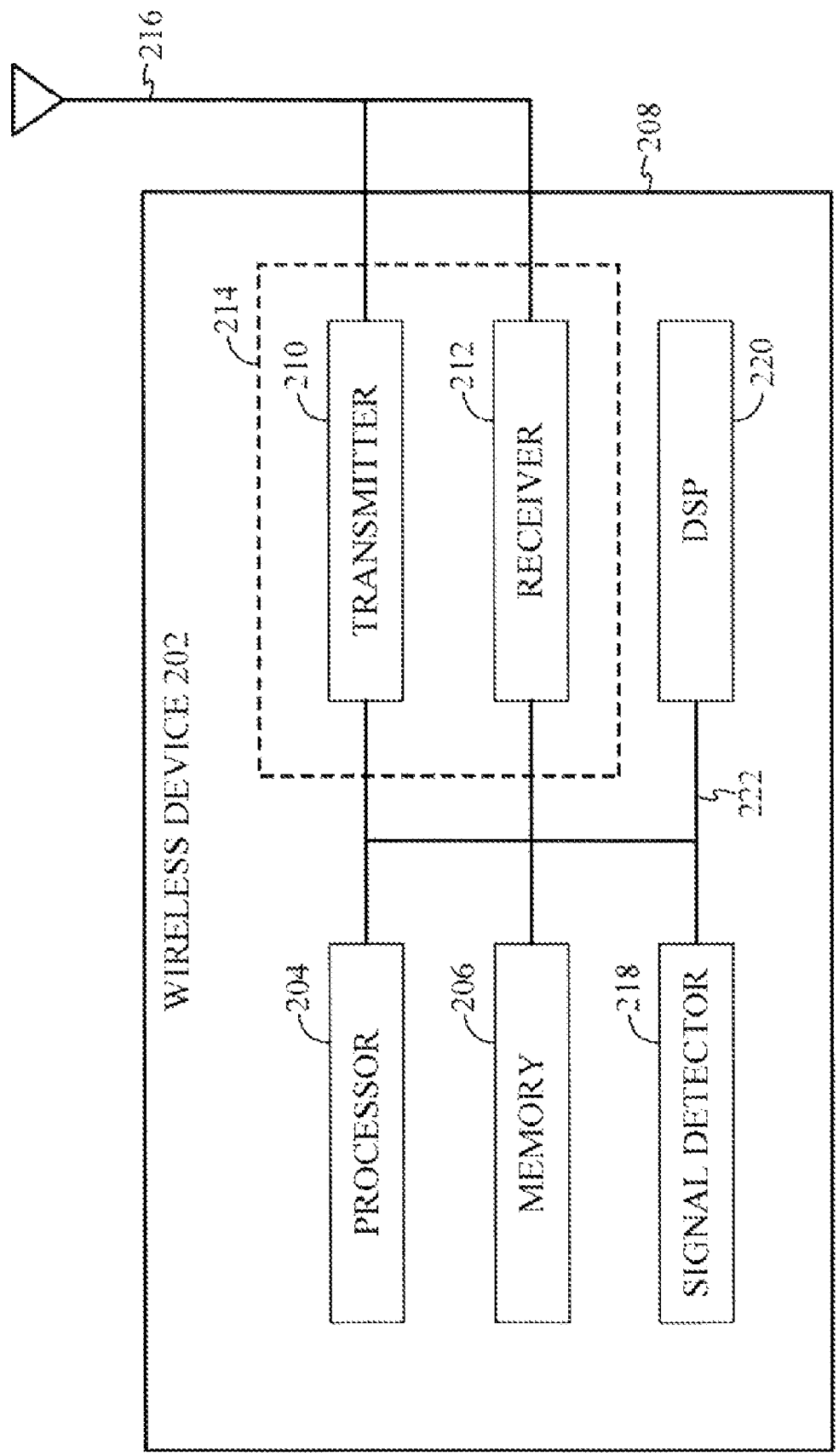
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
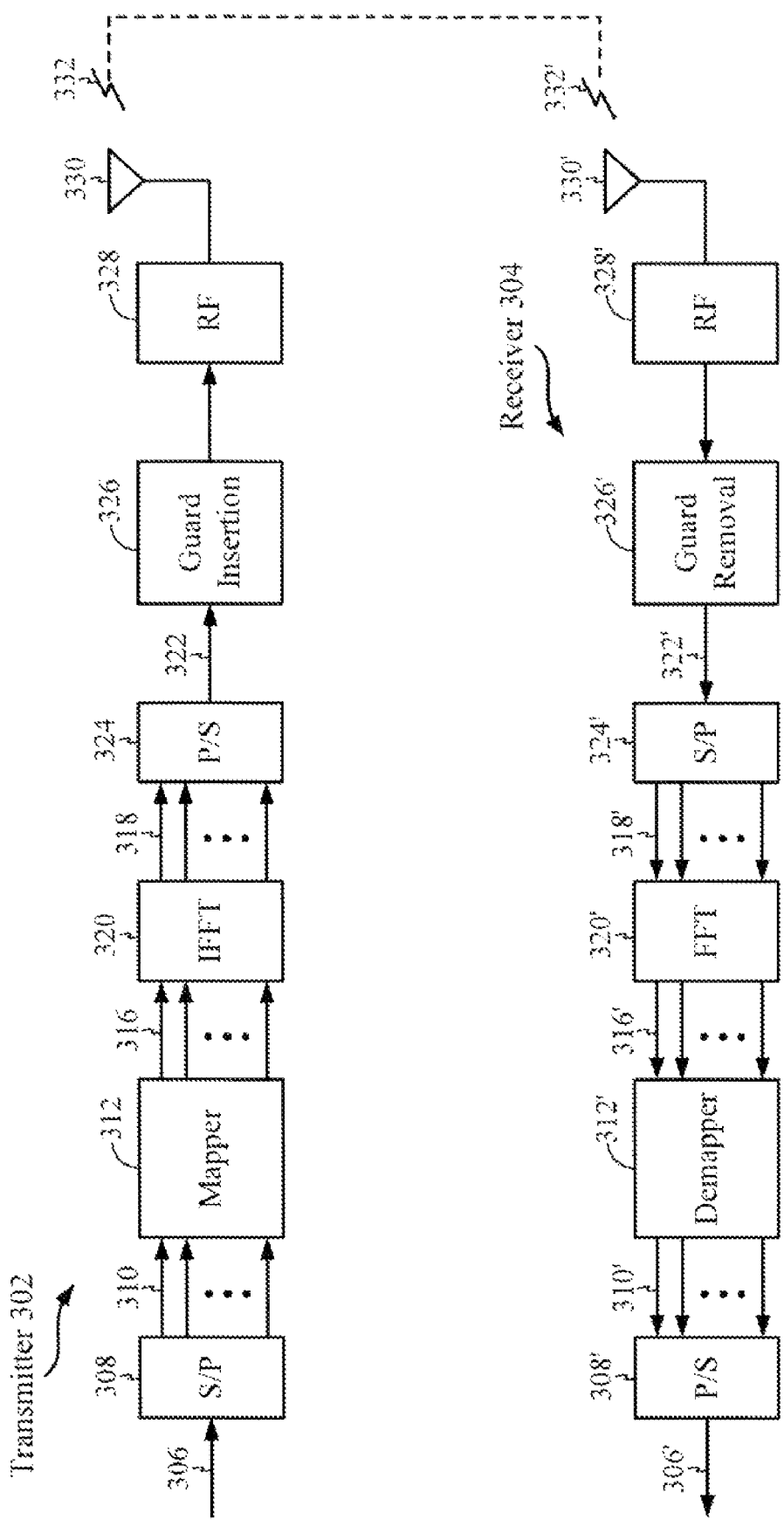
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping plus N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal sub-carriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

An Exemplary HARQ Transmission

Figure 3A:
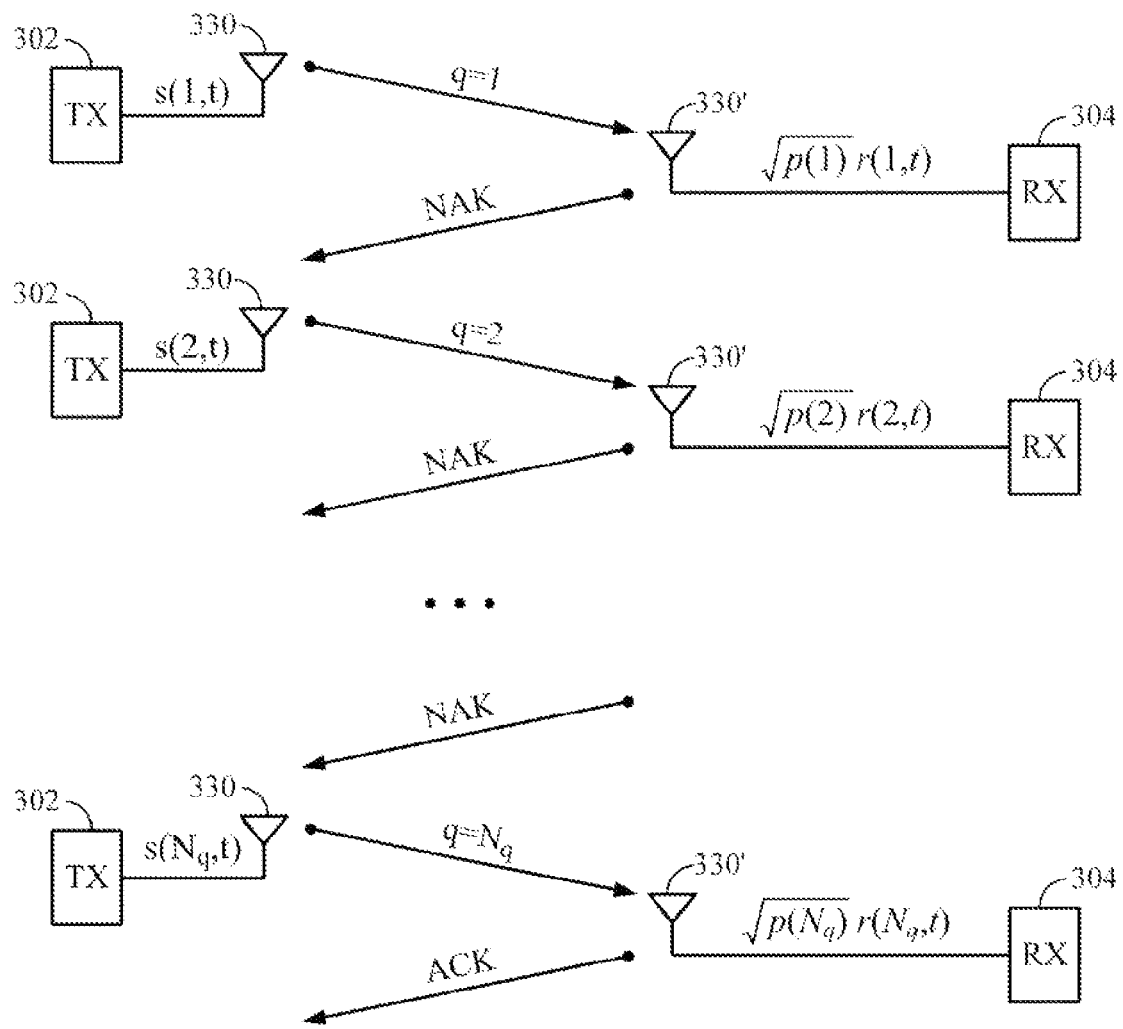
FIG. 3A illustrates hybrid automatic repeat-request (HARQ) transmission, in accordance with certain embodiments of the present disclosure.

To increase the reliability of communications between a base station 104 and a user terminal 106, one or more of the cells 102 of the system 100 may utilize a HARQ error control method. FIG. 3A illustrates a basic sequence of HARQ transmissions. A transmitter (TX) 302, such as the base station 104, broadcasts a first signal s(1,t) containing a HARQ message via an antenna 330. An antenna 330' of a receiver (RX) 304, contained within a wireless device 202 such as a user terminal 106, receives the broadcast first signal as received signal r(1,t) with a certain power $\sqrt{p(1)}$.

The first received signal r(1,t) may be processed and decoded by the receiver 304. In decoding the message, error correction bits (e.g., a checksum) generated for the data payload may be compared against error correction bits sent in the message. A match between the generated and transmitted error correction bits indicates the decoded message is correct, while a mismatch indicates one or more of the bits in the decoded message are not correct.

If the decoded message is not correct, the receiver 304 transmits a not-acknowledged (NAK) signal back to the transmitter 302. Assuming Chase combining, the transmitter 302, upon receiving the NAK signal, retransmits the same signal s(q,t) containing the HARQ message again for the $q^{th}$ iteration (q=2 in the illustrated example). This process is repeated until (at $q=N_q$) the decoded message is correct and the receiver 304 transmits an ACK signal to the transmitter 302, indicating successful reception and decoding of the correct HARQ message.

Figure 4A:
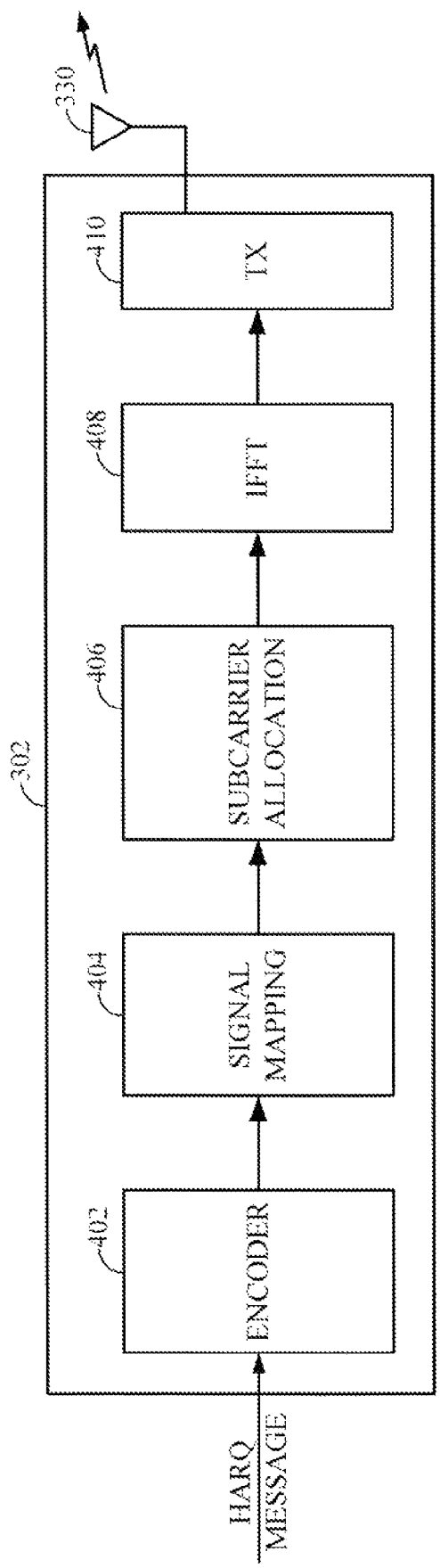
FIG. 4A illustrates an example transmitter for HARQ transmission, in accordance with certain embodiments of the present disclosure.

FIG. 4A illustrates an example block diagram of the transmitter 302 for some embodiments employing HARQ transmission. Assuming OFDM or OFDMA is utilized, a HARQ message may be encoded by an encoder 402, and the encoded bits may be mapped in signal mapping block 404 according to the desired digital modulation scheme by using a constellation diagram, for example.

In the subcarrier allocation block 406, the mapped signals may be allocated into assigned subcarriers according to their position on the constellation diagram. Usually, the assigned subcarriers comprise multiple subcarriers that may be distributed across several symbols along the time axis and several subcarriers across frequency axis. The subcarrier signals may be transformed into the time domain using an inverse fast Fourier transform (IFFT) in the IFFT block 408, and the transformed signals may be transmitted into a wireless channel 334 using transmit circuitry 410 and an antenna 330.

Figure 4B:
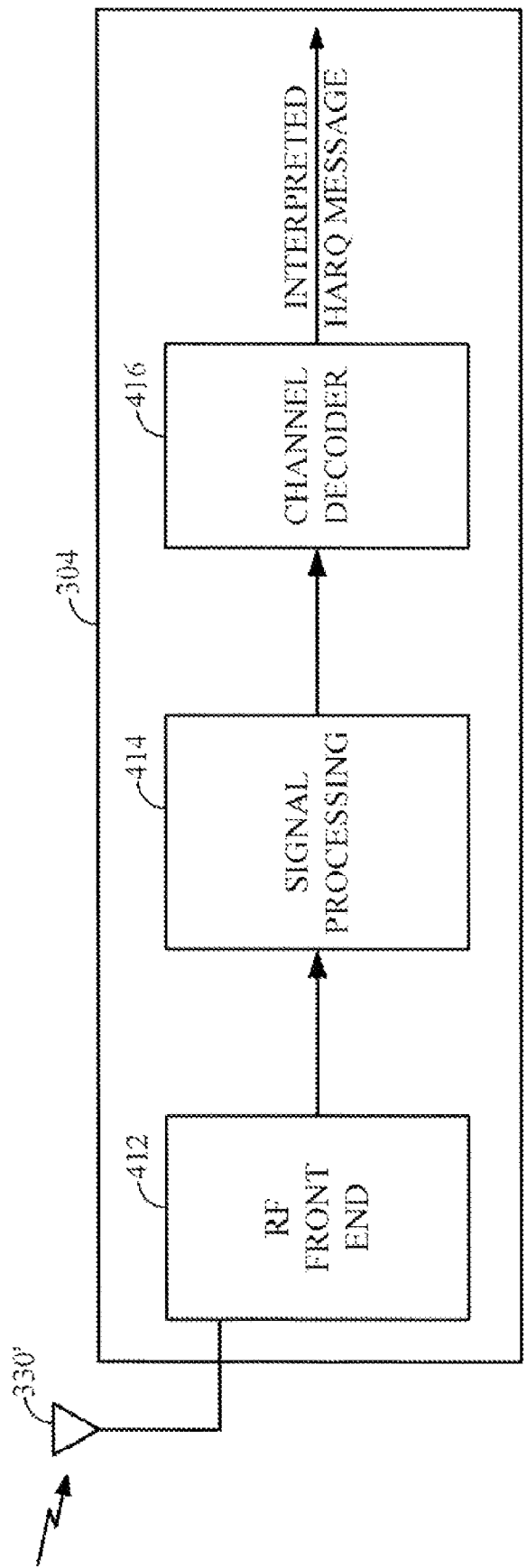
FIG. 4B illustrates an example receiver for HARQ transmission, in accordance with certain embodiments of the present disclosure.

FIG. 4B illustrates a block diagram of the receiver 304 capable of receiving the transmitted signals in certain embodiments. An antenna 330' may receive transmitted signals from the transmitter 302 and send them to an RF front end 412. The RF front end 412 may include any suitable circuits for receiving the transmitted signals and preparing them for digital signal processing, such as automatic gain control (AGC), a fast Fourier transform (FFT) block, a channel estimator, and a carrier-to-interference-and-noise ratio (CINR) estimator.

Signals from the RF front end 412 may then be sent to a signal processing block 414 for demodulating the signals and any HARQ combining that may need to be done for retransmitted messages. Thus, the signal processing block 414 may contain any suitable circuits for subcarrier deallocation, signal demapping, HARQ combining, and signal weighting. The processed signals may be sent from the signal processing block 414 to the channel decoder 416, which may decode the demapped, HARQ-combined encoded bits, output a decoded HARQ message, and check the error bits to see if the message was decoded correctly.

For some embodiments, portions of the RF front end 412, the signal processing block 414, and/or the channel decoder 416 may be implemented in a digital signal processor (DSP). The DSP may comprise logic for executing any suitable function described above, such as signal demapping, HARQ combining, and channel decoding.

An Exemplary Selective HARQ Combining Scheme

As previously described, certain embodiments of the present disclosure may select between different HARQ combiners, for example, implemented at different processing stages in the signal processing block 414 of a receiver. For example, one type of combiner may be positioned before the signal demapper and may be designated as a Type A combiner. Another type of combiner may be positioned after the signal demapper and may be considered as a Type B combiner. A third type of combiner may be positioned just before the channel decoder 416 and may be dubbed as a Type C combiner. Depending on the particular embodiment, an OFDM/OFDMA receiver for HARQ transmission may include a combination of a Type A, Type B, and/or Type C combiner, with each type of combiner described in greater detail below.

The receiver 304 will include logic to select which type of combiner will be used, in some cases, for a given wireless channel. In such a selective HARQ (S-HARQ) combining scheme, one or more of the HARQ combiners may share a HARQ buffer or each HARQ combiner may have its own buffer. Non-selected combiners may be effectively disabled, for example, by bypassing that combiner with an alternate signal path.

Selection of the combiner for a certain HARQ channel may depend on various criteria, such as the modulation order of the transmitted signal and the headroom in the HARQ buffer(s). For example, if the HARQ transmission employs a high modulation order (e.g., 256 point quadrature amplitude modulation (256-QAM), 64-QAM, or 16-QAM), the Type A combiner may be selected. If the HARQ transmission uses a medium modulation order (e.g., 16-QAM or quadrature phase-shift keying (QPSK)), the Type B combiner may be selected. If the HARQ channel is associated with a low modulation order transmission (e.g., QPSK or binary phase-shift keying (BPSK)), the Type B or Type C combiner may be selected.

As portrayed by the provided examples, there may be some overlap between the different types of HARQ combiners for certain modulation orders. Another criterion for combiner selection may be the number of bits needed for the combined signals for each type of combiner, which affects buffer space consumption. The S-HARQ combining scheme may significantly reduce the required HARQ buffer size, when compared to conventional combining schemes, while still providing improved combining gain.

Figure 5:
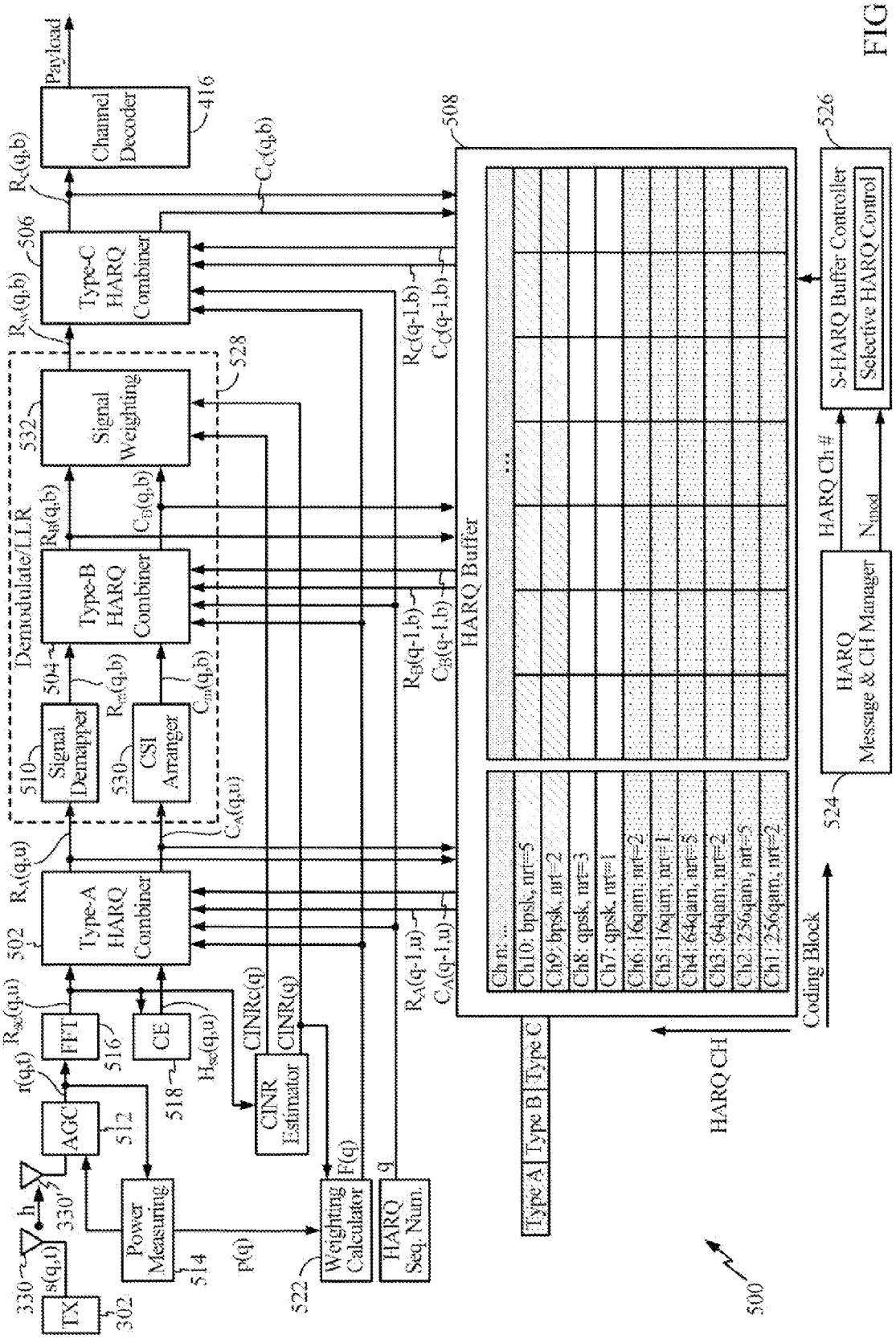
FIG. 5 illustrates one example of the receiver of FIG. 4B, in accordance with certain embodiments of the present disclosure.

FIG. 5 is a block diagram 500 of a receiver with multiple combiners located at different processing stages capable of performing S-HARQ combining in accordance with certain embodiments of the present disclosure. Different embodiments may have different combinations of different types of combiners at different processing stages, which may share a single HARQ buffer or have multiple HARQ buffers.

In the illustrated embodiment, the receiver includes a Type A combiner 502, a Type B combiner 504, a Type C combiner 506, and a single HARQ buffer 508 common to all three combiners. In the illustrated example, the Type A combiner 502 is positioned before the signal demapper 510, while the Type B combiner 504 is positioned just after the signal demapper 510. The Type C combiner 506 may be positioned just before the channel decoder 416.

The description that follows for the S-HARQ combining scheme assumes that the receiver 304 is receiving the $q^{th}$ HARQ message and has already received q−1 HARQ messages before receiving the $q^{th}$ HARQ message. For the $q^{th}$ HARQ message, the transmitter 302 broadcasts a signal s(q,t) for transmission across wireless channel h having properties h(q,t) in the time domain. The receiver 304 receives the transmitted signal, which may have signal amplitude $\sqrt{p(q)}r(q,t)=\sqrt{p(q)}(s(q,t)\oplus h(q,t)+n(q,t))$, where p(q) is the measured power of the $q^{th}$ reception and n(q,t) is an additive noise term.

The RF front end 412 of the receiver 304 may include an AGC 512 for the gain of the received signal such that all signals at the output of the AGC 512 may have the same amplitude. As feedback and control for the AGC 512, the RF front end 412 may contain a power measuring circuit 514 to measure p(q) from the output of the AGC 512. The regulated output of the AGC 512, may be considered to be a normalized signal r(q,t).

The RF front end 412 may also include an FFT block 516 for transforming the normalized received signal r(q,t) from the time domain into the frequency domain. The output of the FFT block 516 is $R_{fft}(q,i,n)$=fft(r(q,i,t)), where $N_{fft}$ is the number of FFT points, i=..., sym(i−1), sym(i), sym(i+1),...; $i^{th}$ OFDM symbol, n=1, 2, ..., $N_{fft}$, and t=1, 2, ..., $N_{fft}$. As shown in FIG. 5, the FFT block 516 may include a subcarrier deallocation block to deallocate the subcarriers from the transformed signal to form signal $R_{sc}(q,u)$, where u=1, 2, ... $N_u$ and $N_u$ is the number of all allocated subcarriers.

Furthermore, the $R_{fft}(q,i,n)$ signal or the $R_{sc}(q,u)$ signal may be sent to a channel estimator (CE) 518, which may estimate the channel for corresponding subcarriers and symbols. The output of the CE 518 may be $H_{sc}(q,i,n)$ or, if the CE 518 includes a subcarrier deallocation block, $H_{sc}(q,u)$ as shown. The $R_{fft}(q,i,n)$ signal or the $R_{sc}(q,u)$ signal may be sent to a Carrier to Interference-plus-Noise Ratio (CINR) estimator 520. The CINR estimator 520 may estimate the signal power ($P_{signal}(q)$), the interference power ($P_{interference}(q)$), the noise power ($P_{noise}(q)$), and the CINR(q) for the $q^{th}$ received signal. The CINR estimator 520 may also calculate a combined CINR(q) as illustrated.

A weighting calculator 522 may calculate a weighting factor F(q) for the $q^{th}$ HARQ signal based on the power p(q) as measured by the power measuring circuit 514 or the CINR (q) as measured by the CINR estimator 520, for example. If a power weighting factor is to be calculated, F(q) may be a ratio of the power of the $q^{th}$ HARQ signal to the power of the first HARQ signal p(1) or a predetermined power $p_{pd}$. As a mathematical equation, the weighting factor may be expressed as $$F(q) = \frac{p(q)}{p(1)} \text{ or } F(q) = \frac{p(q)}{p_{pd}}$$

If a CINR weighting factor is to be calculated, F(q) may be a ratio of the CINR of the $q^{th}$ HARQ signal to the CINR of the first HARQ signal CINR(1) or a predetermined carrier-to-interference-and-noise ratio $CINR_{pd}$. As a mathematical equation, the weighting factor may be expressed as $$F(q) = \frac{CINR(q)}{CINR(1)} \text{ or } \frac{CINR(q)}{CINR_{pd}}$$

The purpose of the weighting factor as calculated by the weighting calculator 522 may be to equalize the power or the CINR of the $q^{th}$ received HARQ signal with the other previously received HARQ signals before combining. By using the weighting factor, noise or changes in the wireless channel between retransmissions that may affect the power of the received signal should not affect the HARQ combining. The use of the weighting factor is described in further detail below.

For a given receiver 304, there may be up to Nharqch HARQ channels, and each HARQ channel may be retransmitted up to Nharqrt times. If Nharqrt is large and an inappropriate type of combiner is selected, the HARQ buffer 508 may rapidly run out of space. The algorithm for selecting a combiner scheme may be designed to take this situation into consideration in an attempt to conserve buffer space.

For example, a HARQ message/channel manager 524 may determine the HARQ channel being decoded (e.g., by channel number) and the modulation order Nmod associated with the channel and may output these to an S-HARQ buffer controller 526 coupled to the HARQ buffer 508. The modulation order Nmod may equal 1 for BPSK, 2 for QPSK, 4 for 16-QAM, 6 for 64-QAM, and 8 for 256-QAM. The S-HARQ buffer controller 526 may use the channel number and the modulation order to determine the headroom in the HARQ buffer 508 and, based on these, select an appropriate type of HARQ combiner according to the description below.

The selected type of combiner may be per channel in the S-HARQ combining scheme. Thus, for any given channel, once a type of combiner has been selected, any subsequent retransmitted messages may use the same combiner type.

Selection between the different types of HARQ combiners may depend on a number of selection criteria and may involve tradeoffs between the required buffer size and performance. By considering the modulation order corresponding to each HARQ channel and the bit width of each HARQ combiner type, the required buffer size may be reduced.

In general, for lower modulation orders, such as BPSK, the required buffer size tends to increase from Type C to Type B to Type A, with Type A requiring a significantly larger buffer than Type B (i.e., ReqBufSizeType-C<ReqBufSizeType-B<<ReqBufSizeType-A). For higher modulation orders, such as 256-QAM, the required buffer size generally tends to increase from Type A to Type B to Type C (i.e., ReqBufSize-Type-A<ReqBufSizeType-B<ReqBufSizeType-C).

However, the bit error ratio (BER) performance for both lower and higher modulation orders is typically best with Type A followed by Type B and then by Type C HARQ combiners. In other words, the BER, or the likelihood of a bit misinterpretation due to electrical noise, is lowest with Type A HARQ combiners (i.e., BERType-A<BERType-B<BERType-C). Considering all of these tendencies, the HARQ buffer controller 526 may generally select the Type A combiner 502 for high modulation order transmissions, the Type B combiner 504 for medium modulation order transmissions, and the Type C combiner 506 for low modulation order transmissions.

Available buffer headroom may also be a factor in the selection criteria for determining which type of HARQ combiner to use according to the S-HARQ combining scheme. For example, the HARQ buffer controller 526 may consider the total number of supported HARQ channels and the amount of free space remaining in the buffer 508 to select an appropriate HARQ combiner for a given channel.

Figure 6A:
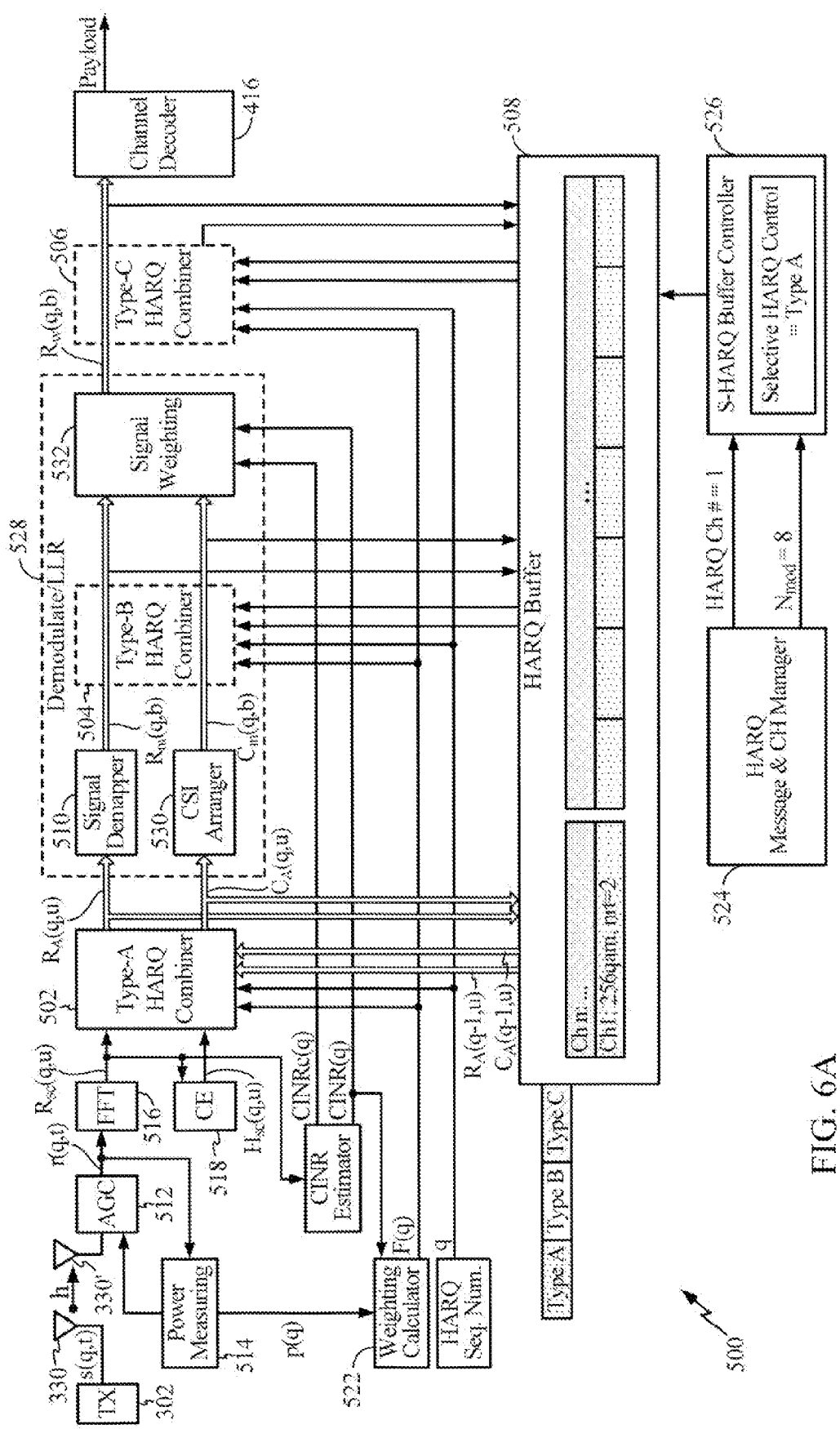
FIGS. 6A-6C illustrate the receiver of FIG. 5 with different combining schemes selected, in accordance with certain embodiments of the present disclosure.
Figure 6B:
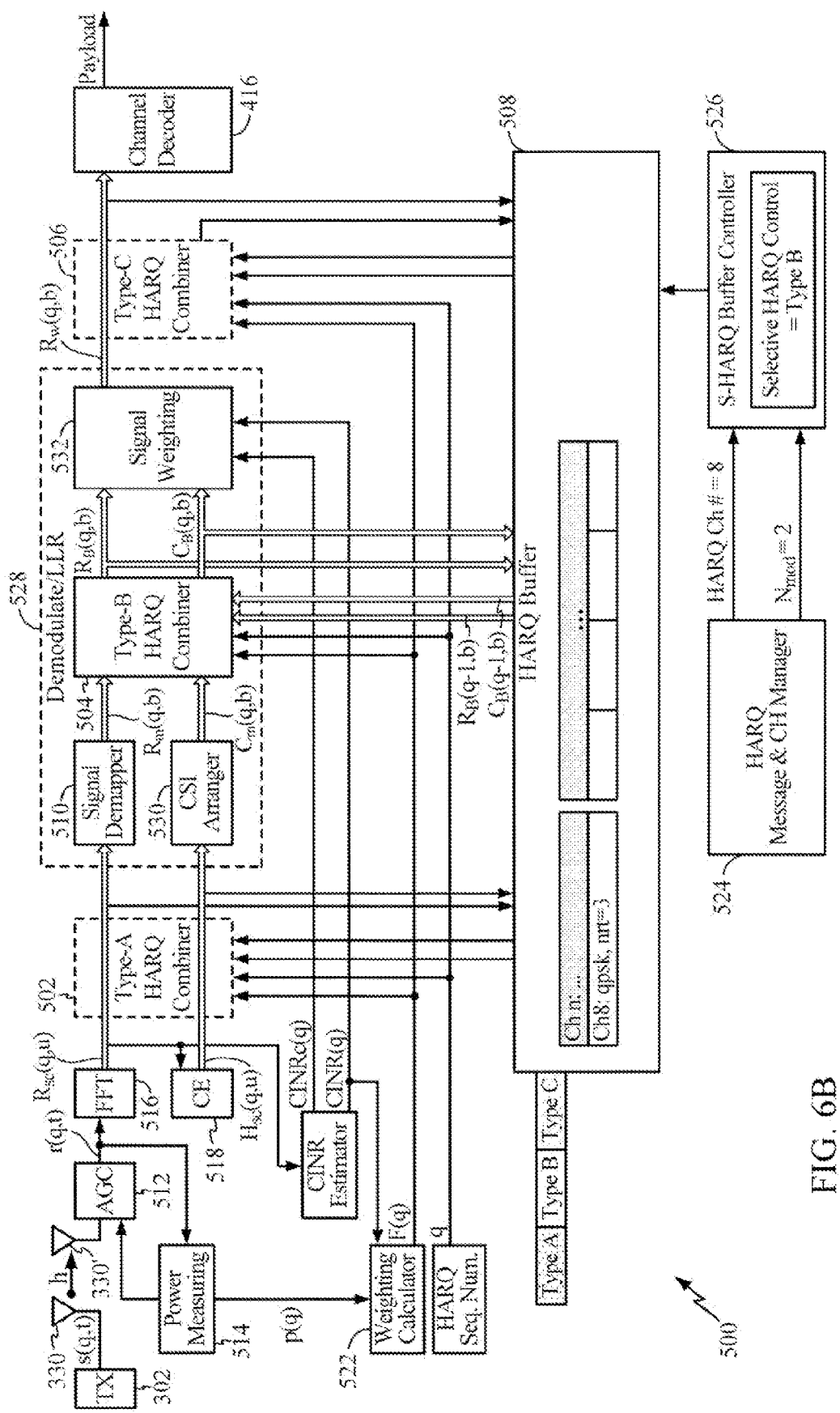
Figure 6C:
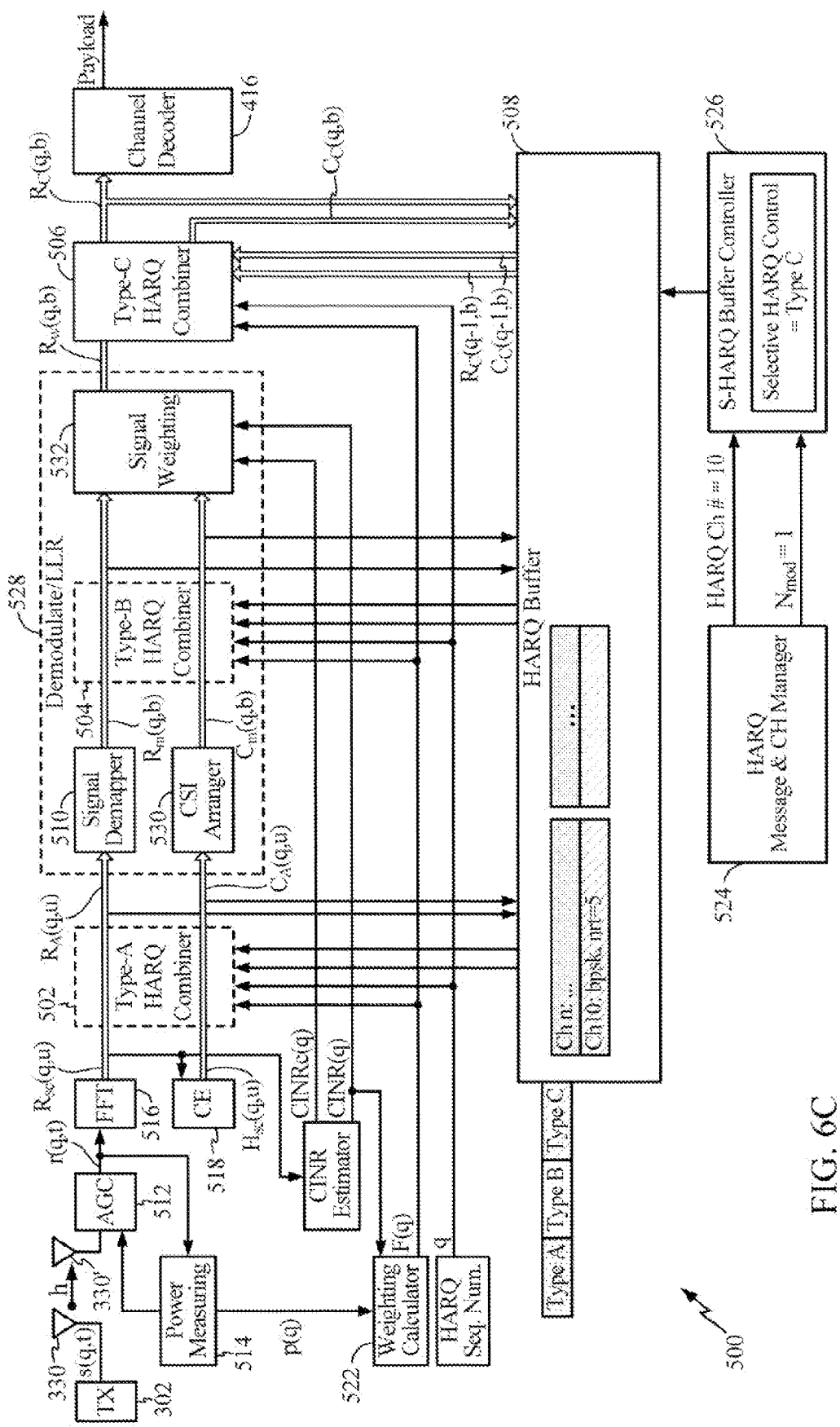

FIGS. 6A-6C illustrate the signal processing flow through the receiver 304 with the different types of combiners selected. The Type A combiner 502 is selected in FIG. 6A, the Type B combiner 504 is selected in FIG. 6B, and the Type C combiner 506 is selected in FIG. 6C. FIGS. 6A-6C also portray the relative differences among the different types of combiners in the required buffer size for storing the combined HARQ signals.

As illustrated in FIG. 6A, if the Type A combiner 502 is selected for a particular channel, HARQ combining may occur at the symbol level before demapping. For the $q^{th}$ received signal, Rsc(q,u) may be combined with the deallocated subcarrier signal RA(q−1,u) from previous HARQ receptions where the decoded message was incorrect in an effort to produce the HARQ combined signal RA(q,u). The output of the CE 518 Hsc(q,u) may also be combined with the channel estimate signal CA(q−1,u) from previous HARQ receptions in an effort to produce the HARQ combined channel estimate signal CA(q,u). The Type A combiner 502 will be described in further detail below.

If the Type A combiner 502 is not selected for this particular channel then the outputs of the FFT block 516 and CE 518 may most likely not be combined with the signals $R_A$(q−1,u) and $C_A$(q−1,u) stored in the buffer from previous HARQ receptions for Type A HARQ combining. Instead, as illustrated in FIGS. 6B and 6C, the outputs of the FFT block 516 and CE 518 may bypass or be passed unchanged through the Type A combiner 502 such that RA(q,u)=Rsc(q,u) and CA(q,u)=Hsc(q,u).

The combined signals RA(q,u) and CA(q,u) may be saved to the HARQ buffer 508 in case the decoded HARQ message for the $q^{th}$ iteration is incorrect, thereby suggesting another retransmission. For some embodiments, the combined signals RA(q,u) and CA(q,u) may replace the previously stored signals in an effort to conserve memory space in the HARQ buffer 508. If the Type A combiner 502 is not selected for this particular channel, the combined signals RA(q,u) and CA(q, u) need not be saved in the HARQ buffer 508.

The RA(q,u) and CA(q,u) signals may enter the demodulation/LLR (log likelihood ratio) block 528. In the signal demapper 510, the RA(q,u) signal may be demapped according to a constellation diagram, for example, for the type of modulation associated with the particular channel. The output of the signal demapper 510 may be a demapped signal Rm(q, b), where b=1, 2, ... Nb, Nb is the number of coded bits for the HARQ message, and $N_b = N_u N_{mod}$. The channel state information (CSI) may be arranged in the CSI arranger 530 according to the corresponding signal demapping occurring in the signal demapper 510 for the particular channel. The CSI arranger 530 may accept CA(q,u) as input and output an arranged CSI signal Cm(q,b).

As illustrated in FIG. 6B, if the Type B combiner 504 is selected for a particular channel, HARQ combining may occur at the demodulated signal level after demapping. For the $q^{th}$ received signal, Rm(q,b) may be combined with the demapped signal RB(q−1,b) from previous HARQ receptions where the decoded message was incorrect in an effort to produce the HARQ combined signal RB(q,b). The output of the CSI arranger 530 Cm(q,b) may also be combined with the CSI signal CB(q−1,b) from previous HARQ receptions in an effort to produce the HARQ combined CSI signal CB(q,b). The Type B combiner 504 will be described in further detail below.

If the Type B combiner 504 is not selected for this particular channel, then the outputs of the signal demapper 510 and CSI arranger 530 may most likely not be combined with the signals RB(q−1,b) and CB(q−1,b) stored in the buffer from previous HARQ receptions for Type B HARQ combining. Instead, as illustrated in FIGS. 6A and 6C, the outputs of the signal demapper 510 and CSI arranger 530 may bypass or be passed unchanged through the Type B combiner 504 such that RB(q,b)=Rm(q,b) and CB(q,b)=Cm(q,b).

The combined signals RB(q,b) and CB(q,b) may be saved to the HARQ buffer 508 in the event that the decoded HARQ message for the $q^{th}$ iteration is incorrect, thereby suggesting another retransmission. For some embodiments, the combined signals RB(q,b) and CB(q,b) may replace the previously stored signals in an effort to conserve memory space in the HARQ buffer 508. If the Type B combiner 504 is not selected for this particular channel, the combined signals RB(q,b) and CB(q,b) need not be saved in the HARQ buffer 508.

As depicted, the combined signals RB(q,b) and CB(q,b) signals may be input to a signal weighting block 532. In the signal weighting block 532, the demodulated received signal RB(q,b) may be adjusted, or weighted, by at least the corresponding CSI signal CB(q,b) to form an output weighted signal Rw(q,b). For some embodiments, the adjustment may include multiplying the demodulated received signal RB(q,b) and the corresponding CSI signal CB(q,b). Also for some embodiments, the CINRc(q) and/or a tuning factor Ftune may be employed when weighting the demodulated signal RB(q, b). The tuning factor may be a function of the modulation type, the bit position of modulation symmetry, and the CINRc and may have a default value of 1. Thus, the weighted signal Rw(q,b) may be expressed as $R_w(q,b) = R_B(q,b) \times C_B(q,b) \times 2 \times CINR_c(q) \times F_{tune}$.

As illustrated in FIG. 6C, if the Type C combiner 506 is selected for a particular channel, HARQ combining may occur at the LLR or soft-bit level just before channel decoding. For the $q^{th}$ received signal, Rw(q,b) may be combined with the weighted signal Rw(q−1,b) from previous HARQ receptions where the decoded message was incorrect in an effort to produce the HARQ combined signal RC(q,b).

By combining after signal weighting in the signal processing block 414, the weighted signal Rw(q,b) may be combined with previous signals, and the CSI signals need not be processed. In this manner, the HARQ buffer 508 need not store CSI information, and the required buffer size may be reduced when Type C HARQ combining is utilized, especially for HARQ channels with low modulation order modulation schemes (e.g., BPSK). The HARQ buffer 508 may also store the weighting factor F(q) for the qth HARQ signal for normalization purposes when the Type C HARQ combiner 506 is selected. The Type C combiner 506 will be described in further detail below.

If the Type C combiner 506 is not selected for this particular channel, then the output of the signal weighting block 532 may most likely not be combined with the weighted signal RC(q−1,b) stored in the buffer 508 from previous HARQ receptions for Type C HARQ combining. Instead, as illustrated in FIGS. 6A and 6B, the outputs of the signal weighting block 532 may bypass or be passed unchanged through the Type C combiner 506 such that RC(q,b)=Rw(q,b).

The combined signal RC(q,b) may be saved to the HARQ buffer 508 lest the decoded HARQ message for the qth iteration is incorrect, thereby suggesting another retransmission. For some embodiments, the combined signal RC(q,b) may replace the previously stored signal in an effort to conserve memory space in the HARQ buffer 508. If the Type C combiner 506 is not selected for this particular channel, the combined signal RC(q,b) need not be saved in the HARQ buffer 508.

The combined signal RC(q,b) may be sent from the signal processing block 414 to the channel decoder 416, which may decode the demapped, HARQ-combined encoded bits and output an interpreted HARQ message for the qth iteration. Based on the correctness of the qth HARQ message, the receiver 304 may transmit an ACK or a NAK signal to the transmitter 302 as described above.

Figure 7:
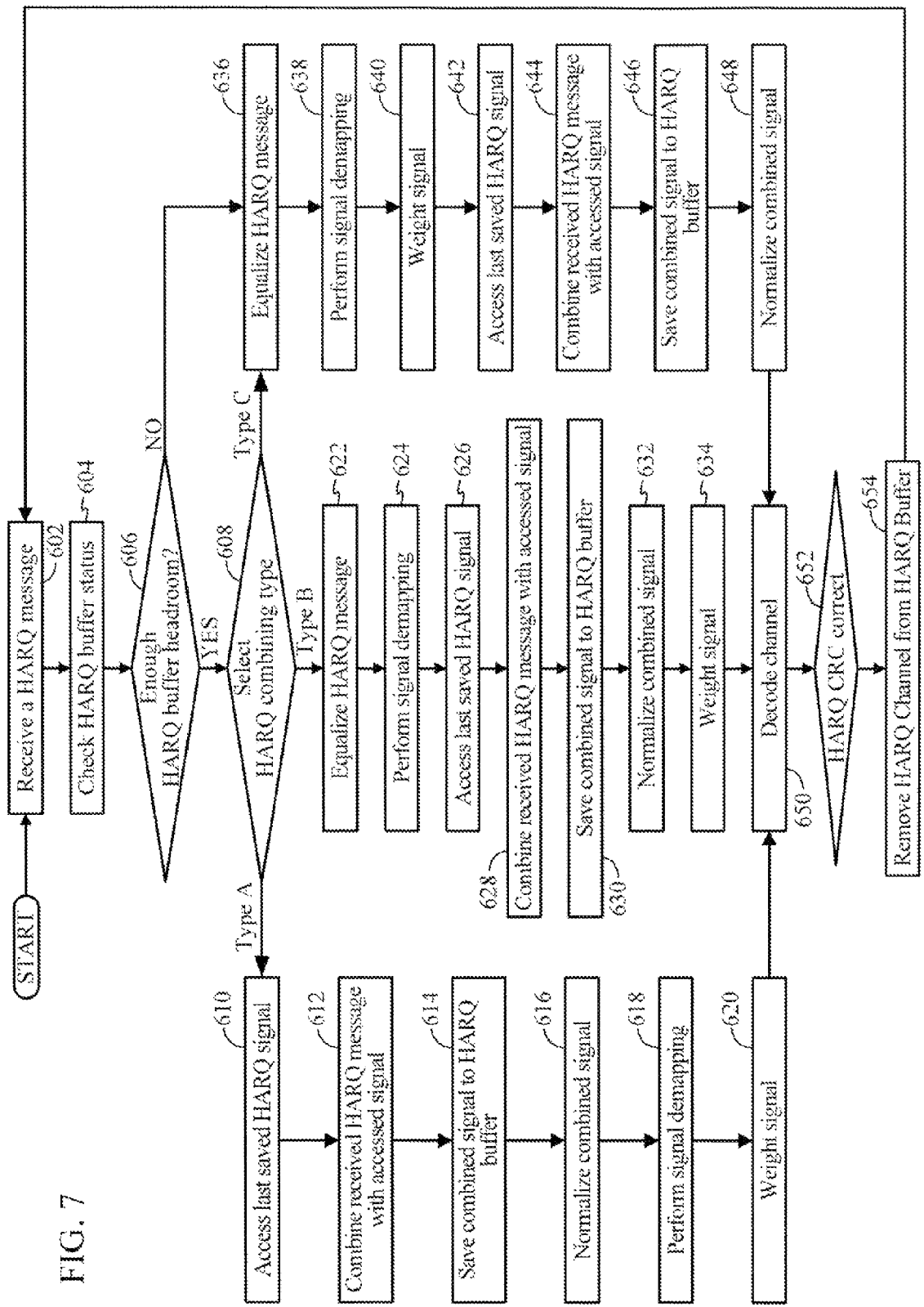
FIG. 7 is a flow diagram of example operations for selective HARQ (S-HARQ) combining, in accordance with certain embodiments of the present disclosure.

FIG. 7 illustrates a flow diagram of example operations 600 for selective hybrid automatic repeat-request (S-HARQ). The operations begin, at 602, by receiving a HARQ message through a certain wireless channel. At 604, the status of HARQ buffer 508 may be checked to determine the headroom. If there is enough headroom at 606, the type of HARQ combiner may be selected at 608 for the wireless channel. The HARQ combining type may depend on one or more of the selection criteria described above. However, if there is not enough headroom, the Type C combiner 506 may be automatically selected as shown.

Of course, if this is the first transmission of the HARQ signal (q=1), HARQ combination need not be performed, so selection of the HARQ combining type should not matter in this case. However, in the event that retransmission is required because the decoded message is incorrect, the first transmission of the HARQ signal may most likely follow the desired type of HARQ combiner for the particular channel in order to save the signal at the appropriate reception stage to the HARQ buffer 508 for HARQ combination in subsequent iterations.

If the Type A combiner 502 is selected at 608, then the previously combined signal that was last saved to the HARQ buffer 508 may be accessed at 610. At 612, the accessed signal may be combined with the received HARQ signal. The new combined signal may be saved to the HARQ buffer 508 at 614 and normalized at 616. The normalized signal may be demapped according to the constellation diagram for the particular channel at 618. At 620, the demapped signal may be weighted with the CSI and sent to the channel decoder 416.

If the Type B combiner 504 is selected at 608, then the HARQ message may be equalized at 622. At 624, the equalized signal may be demapped according to the constellation diagram for the particular channel. The previously combined signal that was last saved to the HARQ buffer 508 may be accessed at 626. At 628, the accessed signal may be combined with the demapped HARQ signal. The new combined signal may be saved to the HARQ buffer 508 at 630 and normalized at 632. The normalized signal may be weighted with the CSI at 634, and the weighted signal may be sent to the channel decoder 416.

If the Type C combiner 506 is selected at 608, then the HARQ signal may be equalized at 636. At 638, the equalized signal may be demapped according to the constellation diagram for the particular channel, and the demapped signal may be weighted with the CSI at 640. The previously combined signal that was last saved to the HARQ buffer 508 may be accessed at 642. At 644, the accessed signal may be combined with the weighted HARQ signal. The new combined signal may be saved to the HARQ buffer 508 at 646 and normalized at 648. The normalized signal may be sent to the channel decoder 416.

At 650, the HARQ combined signal from the selected type of HARQ combiner may be decoded in the channel decoder 416. If the designated bits of the HARQ message—such as the error detection (ED) bits, which may include cyclic redundancy check (CRC) bits, and the forward error correction (FEC) bits—are correct, then the message may be interpreted to be successfully transmitted and received. The particular HARQ channel may be removed from the HARQ buffer 508 at 654, and the operations may repeat with the reception of a new HARQ message from a different wireless channel at 602. However, if any of the designated bits of the HARQ message are incorrect, the receiver 304 may send a request to the transmitter 302 for a retransmission of the HARQ message as described above, and the operations may repeat beginning with 602 for the same channel.

An Exemplar Type A Combiner

Figure 8:
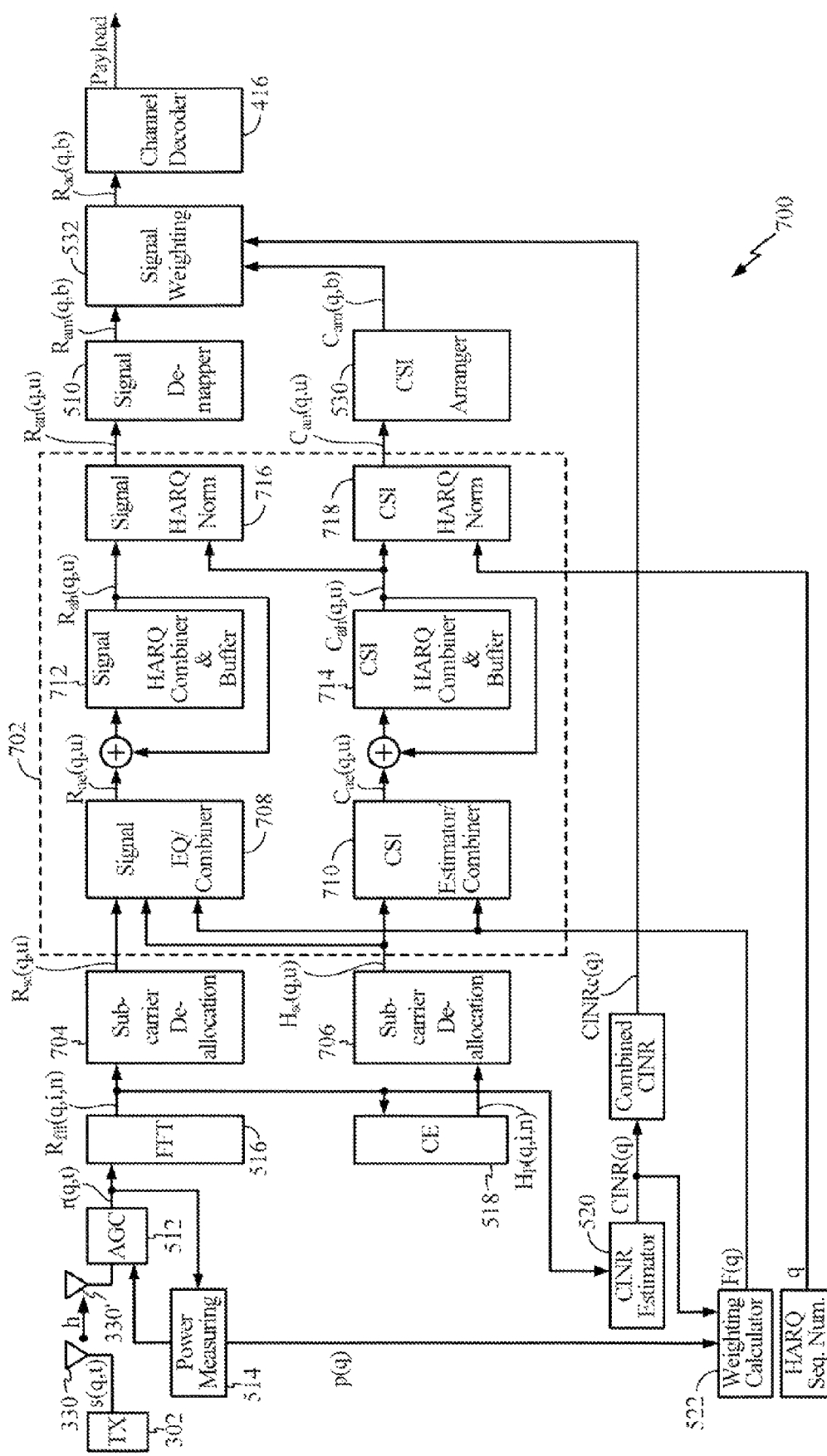
FIG. 8 illustrates HARQ combining before signal demapping in a receiver, in accordance with certain embodiments of the present disclosure.

Referring now to FIG. 8, an example Type A combiner for combining multiple HARQ signals before signal demapping is illustrated. The block diagram 700 of FIG. 8 may be considered as a fixed Type A HARQ combining scheme. However, the details of the Type A HARQ combiner 702 within the dotted line of FIG. 8 may be included in the Type A combiner 502 of the S-HARQ combining scheme shown in FIG. 5 for some embodiments.

This scheme, where the combining is performed before constellation demapping, may use a maximum ratio combining (MRC) scheme in an effort to provide increased diversity combining gain. This may be done recursively by adding incoming HARQ signals with weighting factors. The weighting factors may be different for each HARQ reception and may be extracted from the CINR (or power) of the incoming HARQ signal of each reception. For the weighting factor, the CINR (or power) of the first reception or a predetermined CINR (or power) may be considered as a reference, and the CINR (or power) of each reception may be normalized by the reference. To avoid noise enhancement, all combined HARQ signals may be magnitude-equalized near the final combining stage of every reception. The resulting signal may be weighted with combined CSI and the CINR before channel decoding.

Many of the blocks in the block diagram 700 of FIG. 8 are similar to the block diagram 500 of FIG. 5 and will not be described again. Similar to FIG. 5, the description that follows for the Type A HARQ combining scheme assumes that the receiver 304 is receiving the $q^{th}$ HARQ message and has already received q−1 HARQ messages before receiving the $q^{th}$ HARQ message.

The output of the FFT block 516 $R_{fft}(q,i,n)$ may be sent to a first subcarrier deallocation block 704 in an effort to deallocate the subcarriers from the transformed signal to form signal $R_{sc}(q,u)$, where u=1, 2, ... $N_u$, and $N_u$ is the number of all allocated subcarriers. The subcarrier deallocation may be performed based on the same permutation used in transmitting the HARQ message. Furthermore, the $R_{fft}(q,i,n)$ signal may be sent to the channel estimator (CE) 518, which may estimate the channel for corresponding subcarriers and symbols. The output of the CE 518 $H_p(q,i,n)$ may be sent to a second subcarrier deallocation block 706 in an effort to deallocate the subcarriers from the channel estimation to form signal $H_{sc}(q,u)$ as shown.

The deallocated $R_{sc}(q,u)$ and $H_{sc}(q,u)$ signals may be sent to the Type A HARQ combiner 702. In a signal equalizer/combiner 708, the power or the CINR of $R_{sc}(q,u)$ may be equalized with that of the other previously received HARQ signals before combining based on the weighting factor as calculated by the weighting calculator 522. By using the weighting factor, noise or changes in the wireless channel between retransmissions that may affect the power of the received signal should not affect the HARQ combining. The output of signal equalizer/combiner 708 $R_{ae}(q,u)$ may be calculated as $R_{ae}(q,u)=F(q)R_{sc}(q,u)H_{sc}(q,u)^*$, where $H_{sc}(q,u)^*$ is the complex conjugate of $H_{sc}(q,u)$ and F(q) is the weighting factor as described above. In a CSI estimator/combiner 710, the power or the CINR of $H_{sc}(q,u)$ may be equalized with that of the other prior channel estimations before combining based on the weighting factor as calculated by the weighting calculator 522. The output of CSI estimator/combiner 710 $C_{ae}(q,u)$ may be calculated as $C_{ae}(q,u)=F(q)|H_{sc}(q,u)|^2$.

For the $q^{th}$ received signal, the equalized signal $R_{ae}(q,u)$ may be combined with the Type A combined signal $R_{ah}(q−1,u)$ from previous HARQ receptions where the decoded message was incorrect in an effort to produce the HARQ combined signal $R_{ah}(q,u)$ according to the equation $R_{ah}(q,u)=R_{ae}(q,u)+R_{ah}(q−1, u)$ in a signal HARQ combiner and buffer block 712. In a CSI HARQ combiner and buffer block 714, the output of the CSI estimator/combiner 710 $C_{ae}(q,u)$ may also be combined with the combined CSI signal $C_{ah}(q−1,u)$ from previous HARQ receptions in an effort to produce the HARQ combined CSI signal $C_{ah}(q,u)$ according to the equation $C_{ah}(q,u)=C_{ae}(q,u)+C_{ah}(q−1,u)$.

The output of the signal HARQ combiner and buffer 712 $R_{ah}(q,u)$ may be normalized in a signal HARQ normalizer 716 by a suitable normalization factor to form normalized signal $R_{an}(q,u)$. For some embodiments, the normalization factor may be the combined CSI signal $C_{ah}(q,u)$ for the $q^{th}$ iteration, such that the normalized signal may be calculated according to the equation $R_{an}(q,u)=R_{ah}(q,u)/C_{ah}(q,u)$. The output of the CSI HARQ combiner and buffer 714 $C_{ah}(q,u)$ may also be normalized in a CSI HARQ normalizer 718 by a suitable normalization factor to form normalized signal $C_{an}(q,u)$. For some embodiments, the normalization factor may be the HARQ sequence number q, such that the normalized signal may be calculated according to the equation $C_{an}(q,u)=C_{ah}(q,u)/q$. For other embodiments, the normalization factor for combined CSI normalization may be the power p(q) of the $q^{th}$ iteration.

Therefore, to summarize the signal output of the Type A HARQ combiner 702, the normalized output signal $R_{an}(q,u)$ may be calculated from the signal input $R_{sc}(q,u)$, the channel estimation input $H_{sc}(q,u)$, and the weighting factor F(q) for any $q^{th}$ iteration according to the following equation:

$$R_{an}(q, u) = \frac{\sum_{q=1}^{N_q}(F(q)R_{sc}(q, u)H_{sc}(q, u)^*)}{\sum_{q=1}^{N_q}(F(q)|H_{sc}(q, u)|^*)}$$

In a similar manner, the CSI output of the Type A HARQ combiner 702 may be calculated from the channel estimation input $H_{sc}(q,u)$ and the weighting factor F(q) for any $q^{th}$ iteration according to the following equations for some embodiments:

$$C_{an}(q, u) = \frac{\sum_{q=1}^{N_q}(F(q)|H_{sc}(q, u)|^*)}{N_q}$$

or $$C_{an}(q, u) = PowerNorm\left(\sum_{q=1}^{N_q}(F(q)|H_{sc}(q, u)|^2)\right)$$

The remaining blocks of the Type A HARQ combiner 702 may function similarly to corresponding blocks in the block diagram of FIG. 5, where $R_A(q,u)=R_{an}(q,u)$, $C_A(q,u)=C_{an}(q,u)$, and the other types of HARQ combiners are bypassed.

An Exemplary Type B Combiner

Figure 9:
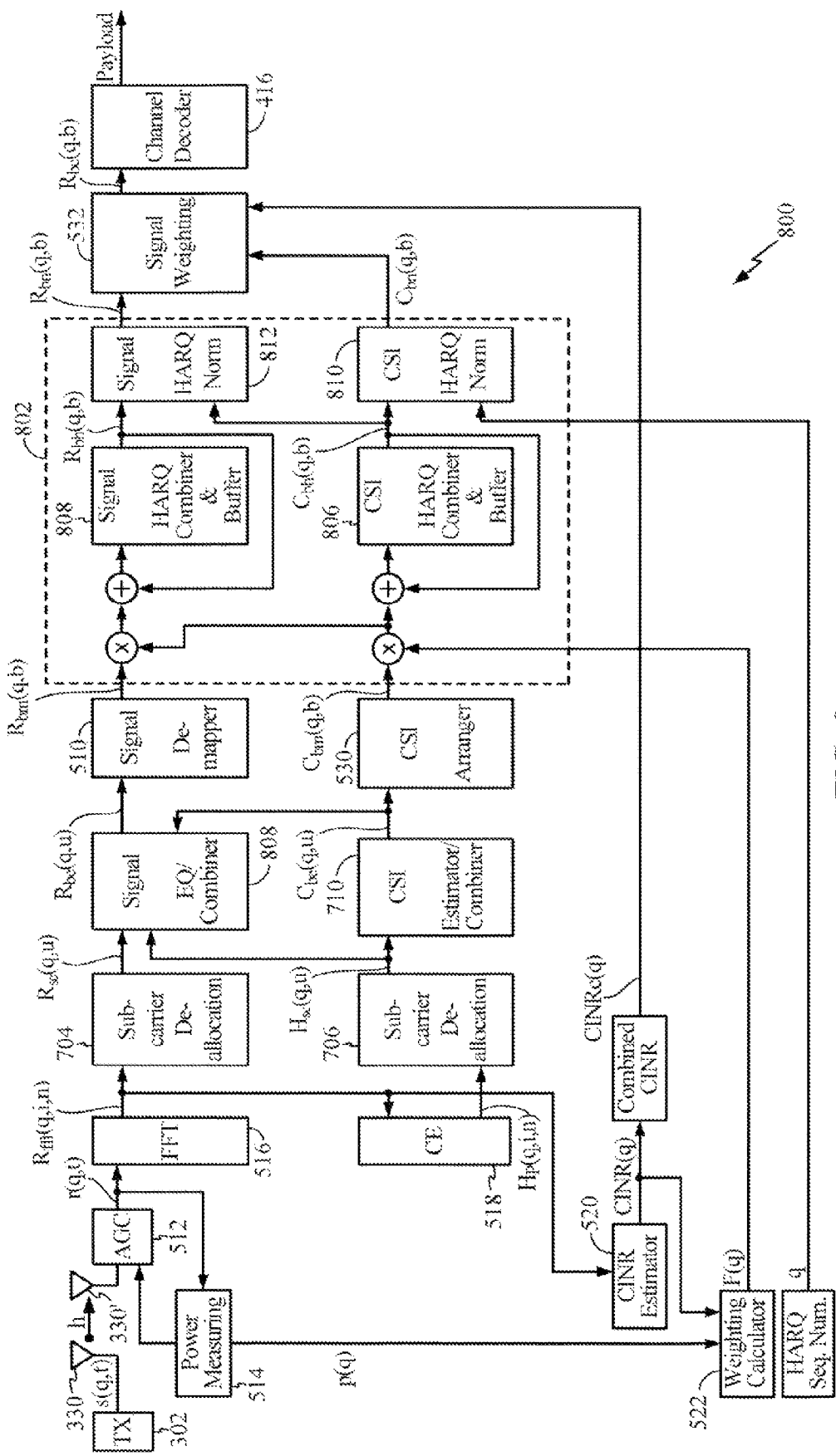
FIG. 9 illustrates HARQ combining after signal demapping in a receiver, in accordance with certain embodiments of the present disclosure.

Referring now to FIG. 9, a Type B HARQ diversity combining scheme for OFDM/OFDMA systems, where the combining of multiple HARQ signals is done after signal demapping, is illustrated. The block diagram 800 of FIG. 9 may be considered as a fixed Type B HARQ combining scheme. However, the details of the Type B HARQ combiner 802 within the dotted line of FIG. 9 may be included in the Type B combiner 504 of the S-HARQ combining scheme shown in FIG. 5 for some embodiments. This scheme, where the combining is performed after constellation demapping, may use an MRC scheme in an effort to provide increased diversity combining gain. This may be done recursively by adding incoming HARQ signals with weighting factors as described above. The weighting factors may be different for each HARQ reception and may be extracted from the CINR (or power) of the incoming HARQ signal of each reception. Incoming HARQ signals may be equalized, demapped, weighted with the weighting factor, and added recursively. The resulting signal may be normalized by the combined CSI at or near the final stage of every reception and weighted with the combined CSI and CINR before channel decoding.

Many of the blocks in the block diagram 800 of FIG. 9 are similar to the block diagrams 500 and 700 of FIGS. 5 and 8, respectively, and will not be described again below. Similar to FIG. 5, the description that follows for the Type B HARQ combining scheme assumes that the receiver 304 is receiving the $q^{th}$ HARQ message and has already received q−1 HARQ messages before receiving the $q^{th}$ HARQ message.

Of note, the output $C_{be}(q,u)$ of the CSI estimator/combiner block 710 may not depend on the weighting factor F(q) and may be calculated as $C_{be}(q,u)=|H_{sc}(q,u)|^2$. $C_{be}(q,u)$ may be used in equalizing the output $R_{sc}(q,u)$ of the first subcarrier deallocation block 704. In a signal equalizer/combiner 804, $R_{sc}(q,u)$ may be equalized by the CSI before HARQ combining. The output of the signal equalizer/combiner 804 $R_{be}(q,u)$ may be calculated as $$R_{be}(q, u) = \frac{R_{sc}(q, u)H_{sc}(q, u)^*}{C_{be}(q, u)}$$

where $H_{sc}(q,u)^*$ is the complex conjugate of $H_{sc}(q,u)$. The output of the signal equalizer/combiner 804 may undergo signal demapping in the signal demapper 510 to form signal $R_{bm}(q,b)$, and the estimated CSI $C_{be}(q,u)$ may be processed in a similar fashion in the CSI arranger 530 to form signal $C_{bm}(q,b)$.

The demodulated outputs $R_{bm}(q,b)$ and $C_{bm}(q,b)$ signals may be sent to the Type B HARQ combiner 802. For the $q^{th}$ received signal, the demodulated CSI signal $C_{bm}(q,b)$ may be multiplied by the weighting factor $F(q)$ and combined with the Type B combined signal $C_{bh}(q-1,b)$ from previous HARQ receptions in an effort to produce the HARQ combined CSI signal $C_{bh}(q,b)$ according to the equation $C_{bh}(q,b)=F(q)C_{bm}(q,b)+C_{bh}(q-1,b)$ in a CSI HARQ combiner and buffer block 806.

The demodulated output $R_{bm}(q,b)$ may be multiplied with the weighting factor $F(q)$ and the demodulated CSI signal $C_{bm}(q,b)$ and combined with the combined Type B combined signal $R_{bh}(q-1,b)$ from previous HARQ receptions where the decoded message was incorrect in an effort to produce the HARQ combined signal $R_{bh}(q,b)$ according to the equation $R_{bh}(q,b)=F(q)C_{bm}(q,b)R_{bm}(q,b)+R_{bh}(q-1,b)$. The calculation of $R_{bh}(q,b)$ may be performed in a signal HARQ combiner and buffer block 808.

The output of the CSI HARQ combiner and buffer 806 $C_{bh}(q,b)$ may be normalized in a CSI HARQ normalizer 810 by a suitable normalization factor to form normalized signal $C_{bn}(q,b)$. For some embodiments, the normalization factor may be the HARQ sequence number q, such that the normalized signal may be calculated according to the equation $C_{bn}(q,b)=C_{bh}(q,b)/q$. For other embodiments, the normalization factor for combined CSI normalization may be the power $p(q)$ of the $q^{th}$ iteration. The output of the signal HARQ combiner and buffer 808 $R_{bh}(q,b)$ may also be normalized in a signal HARQ normalizer 812 by a suitable normalization factor to form normalized signal $R_{bn}(q,b)$. For some embodiments, the normalization factor may be the combined CSI signal $C_{bh}(q,b)$ for the $q^{th}$ iteration, such that the normalized signal may be calculated according to the equation $R_{bn}(q,b)=R_{bh}(q,b)/C_{bh}(q,b)$.

Therefore, to summarize the recursive signal output of the Type B HARQ combiner 802 for the $q^{th}$ iteration, the normalized output signal $R_{bn}(q,b)$ may be calculated from the demapped signal input $R_{bm}(q,b)$, the CSI signal input $C_{bm}(q,b)$, and the weighting factor $F(q)$ according to the following equation:

$$R_{bn}(q, b) = \frac{\sum_{q=1}^{N_q} (F(q)R_{bm}(q, b)|H_{bm}(q, b)|^2)}{\sum_{q=1}^{N_q} (F(q)|H_{bm}(q, b)|^2)}$$

In a similar manner, the recursive CSI output of the Type B HARQ combiner 802 may be calculated from the CSI signal input $C_{bm}(q,b)$ and the weighting factor $F(q)$ for any $q^{th}$ iteration according to the following equations for some embodiments:

$$C_{bn}(q, b) = \frac{\sum_{q=1}^{N_q}(F(q)|C_{bm}(q, b)|^*)}{N_q}$$

or $$C_{bn}(q, b) = PowerNorm\left(\sum_{q=1}^{N_q}(F(q)|C_{bm}(q, b)|^2)\right)$$

The remaining blocks of the Type B HARQ combiner 802 may function similarly to corresponding blocks in the block diagram of FIG. 5, where $R_B(q,b)=R_{bn}(q,b)$, $C_B(q,b)=C_{bn}(q,b)$, and the other types of HARQ combiners are bypassed.

An Exemplary Type C Combiner

Figure 10:
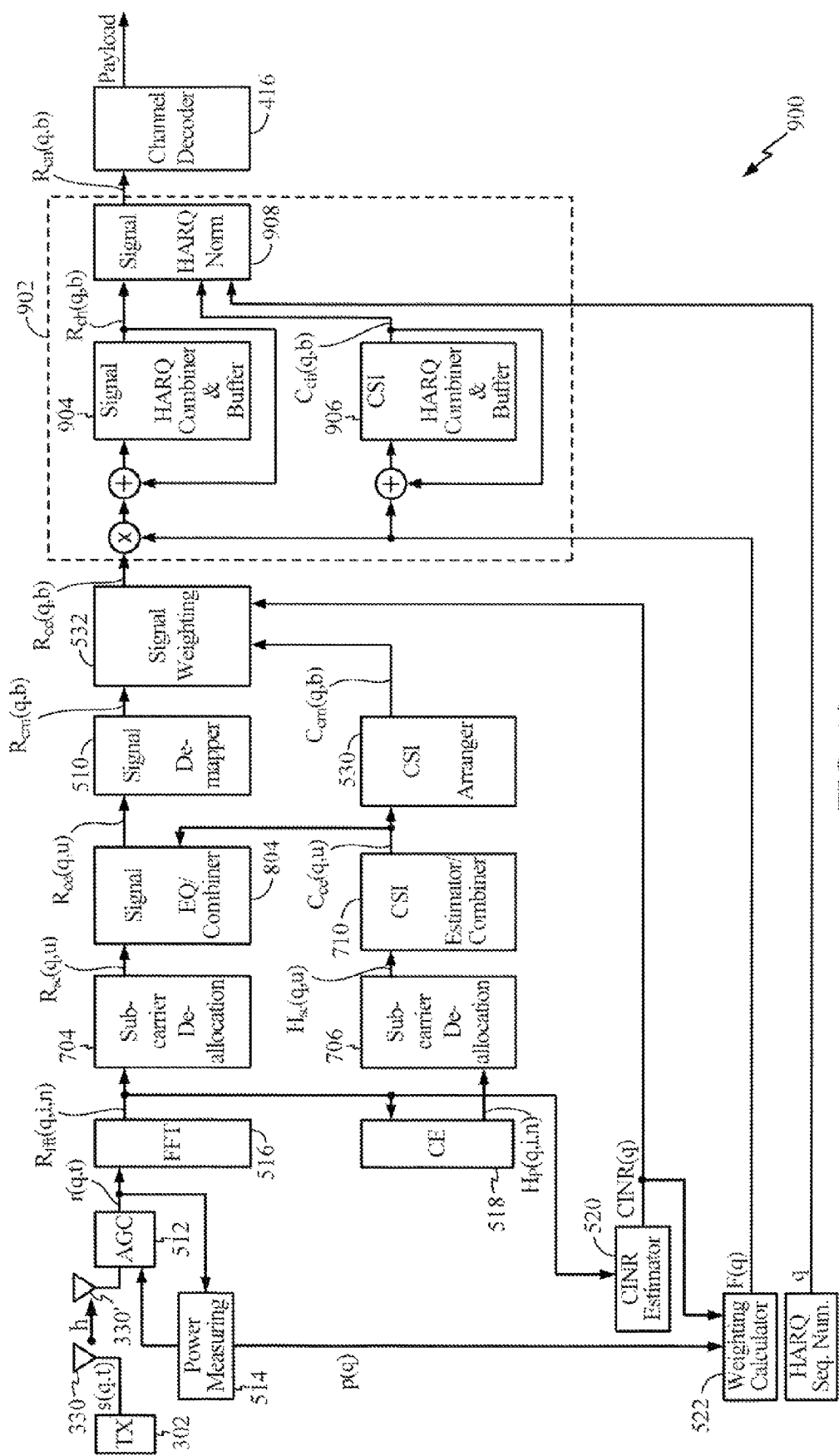
FIG. 10 illustrates HARQ combining before channel decoding in a receiver, in accordance with certain embodiments of the present disclosure.

Referring now to FIG. 10, a Type C HARQ diversity combining scheme for OFDM/OFDMA systems, where the combining of multiple HARQ signals is done before channel decoding, is illustrated. The block diagram 900 of FIG. 10 may be considered as a fixed Type C HARQ combining scheme. However, the details of the Type C HARQ combiner 902 within the dotted line of FIG. 10 may be included in the Type C combiner 506 of the S-HARQ combining scheme shown in FIG. 5 for some embodiments.

The Type C combining scheme may be done recursively by adding incoming HARQ signals with weighting factors as described above. The weighting factors may be different for each HARQ reception and may be extracted from the CINR (or the power) of the incoming HARQ signal of each reception. Incoming HARQ signals may be equalized, demapped, weighted by the CSI and CINR of each reception. The resulting signal may be adjusted by the weighting factor, added recursively, and normalized by the combined weighting factor before channel decoding.

Many of the blocks in the block diagram 900 of FIG. 10 are similar to the block diagrams 500 and 800 of FIGS. 5 and 9, respectively, and will not be described again below. Similar to FIG. 5, the description that follows for the Type C HARQ combining scheme assumes that the receiver 304 is receiving the $q^{th}$ HARQ message and has already received q-1 HARQ messages before receiving the $q^{th}$ HARQ message.

For the Type C HARQ combining scheme of FIG. 10, rather than sending the output of the signal equalizer/combiner 804 $R_{cm}(q,b)=R_{bm}(q,b)$ and the output of the CSI arranger 530 $C_{cm}(q,b)=C_{bm}(q,b)$ to be combined, these signals may be sent to the signal weighting block 532. In the signal weighting block 532, the demodulated received signal $R_{cm}(q,b)$ may be adjusted by at least the corresponding CSI signal $C_{cm}(q,b)$ to form an output weighted signal $R_{cc}(q,b)$. For some embodiments, the adjustment may include multiplying the demodulated received signal $R_{cm}(q,b)$ with the corresponding CSI signal $C_{cm}(q,b)$, the CINR(q), and a tuning factor $F_{tune}$ according to the expression $R_{cc}(q,b)=R_{cm}(q,b)\times C_{cm}(q,b)\times 2\times CINR(q)\times F_{tune}$.

The weighted output signal $R_{cc}(q,b)$ may be sent to the Type C HARQ combiner 902. For the $q^{th}$ received signal, $R_{cc}(q,b)$ may be multiplied by the weighting factor $F(q)$ and combined with the Type C combined signal $R_{cc}(q-1,b)$ from previous HARQ receptions in an effort to produce the HARQ combined signal $R_{ch}(q,b)$ according to the equation $R_{ch}(q,b)$ =$F(q)R_{cc}(q,b)+R_{ch}(q-1,b)$ in a signal HARQ combiner and buffer block 904. The weighting factor $F(q)$ may be combined with the Type C combined CSI signal $C_{ch}(q-1,b)$ from previous HARQ receptions where the decoded message was incorrect in an effort to produce the HARQ combined CSI signal $C_{ch}(q,b)$ according to the equation $C_{ch}(q,b)=F(q)+C_{ch}(q-1,b)$. The calculation of $C_{ch}(q,b)$ may be performed in a CSI HARQ combiner and buffer block 906.

The output of the signal HARQ combiner and buffer 904 $R_{ch}(q,b)$ may be normalized in a signal HARQ normalizer 908 by a suitable normalization factor to form normalized signal $R_{cn}(q,b)$. For some embodiments, the normalization factor may be the combined CSI signal $C_{ch}(q,b)$ for the $q^{th}$ iteration, such that the normalized signal may be calculated according to the equation $R_{cn}(q,b)=R_{ch}(q,b)/C_{ch}(q,b)$.

Therefore, to summarize the recursive signal output of the Type C HARQ combiner 902 for the $q^{th}$ iteration, the normalized output signal $R_{cn}(q,b)$ may be calculated from the weighted signal input $R_{cc}(q,b)$ and the weighting factor $F(q)$ according to the following equation:

$$R_{cn}(q,b) = \frac{\sum_{q=1}^{N_q}(F(q)R_{cc}(q,b))}{\sum_{q=1}^{N_q}F(q)}$$

The remaining blocks of the Type B HARQ combiner 902 may function similarly to corresponding blocks in the block diagram of FIG. 5, where $R_C(q,b)=R_{cn}(q,b)$.

An Exemplary Coding Block Based HARQ Combining Scheme

As described above, HARQ combining and channel decoding may be performed for each reception of each HARQ channel. From checking the CRC bits of each HARQ channel, the receiver 304 may transmit ACK to the transmitter 302 if the results of decoding are correct. However, the receiver 304 may transmit NAK to the transmitter if the results of decoding are incorrect, and the HARQ buffer 508 may save the results of HARQ combining for subsequent combining of the HARQ channel during future iterations.

Figure 11:
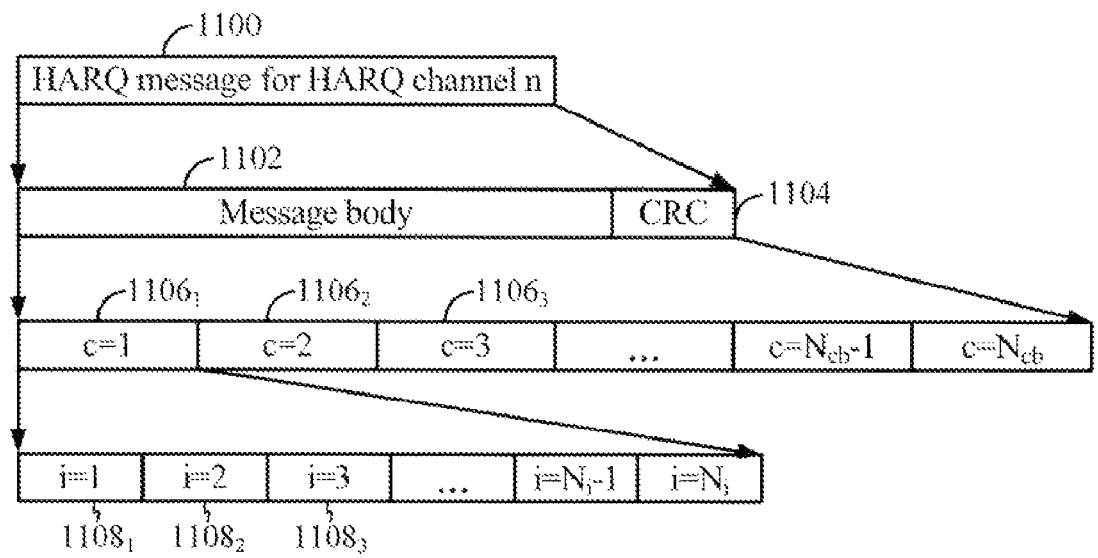
FIG. 11 illustrates the breakdown of a HARQ message into coding blocks, in accordance with certain embodiments of the present disclosure.

FIG. 11 is an example of a typical HARQ message 1100. A HARQ message may include a message body 1102 and a cyclic redundancy check (CRC) portion 1104. The HARQ message 1100 may be partitioned into a number of coding blocks 1106 ($N_{cb}$), and $N_{cb}$ may be different for each HARQ channel. Each coding block 1106 may consist of a number of bits 1108 ($N_i$), and $N_i$ may be different for each coding block 1106, even coding blocks in the same HARQ channel. For example, the first coding block $1106_1$ in the message 1100 may comprise 16 bits, while the second coding block $1106_2$ may comprise 20 bits. This division into coding blocks 1106 may allow for a further reduction in the memory size of the HARQ buffer 508 without sacrificing any HARQ performance or combining gain.

According to such a coding-block-based HARQ combining scheme, when a decoded HARQ message 1100 has an error, some criteria, such as the quality of each coding block 1106, may be examined to decide whether that particular coding block should be saved for combining. The corresponding HARQ combined signals of each coding block 1106 may be saved for combining in subsequent iterations if the coding block has not passed the criteria after channel decoding. However, if any of the coding blocks 1106 have passed the criteria after channel decoding, the decoded bits of each passing coding block will be saved in the HARQ buffer 508 instead of the HARQ combined signals.

The criteria to determine a pass or a fail may be checked on a coding block basis. For example, a coding block 1106 may pass the criteria if the likelihood (or distance) of the decoded coding block is greater (or less) than a certain threshold, and the coding block 1106 will not pass the criteria if the likelihood (or distance) is less (or greater) than or equal to the threshold. For some embodiments, other factors may also be considered when determining whether a coding block 1106 passed or failed the criteria. These factors may include any combination of the modulation order of the channel, the coding rate, the channel state information (CSI), the channel quality, the number of the HARQ transmission for the channel, and the decoding results of each HARQ channel. By considering other factors in addition to the likelihood (or distance), the reliability in determining whether a particular coding block 1106 should be saved for combining may be increased.

Generally, the bit width of any HARQ combined signal is substantially greater than the corresponding decoded bits. Thus, the memory requirements (i.e., the required HARQ buffer size) may be significantly reduced by using coding-block-based HARQ combining as disclosed herein. In addition to reducing the required HARQ buffer size while preserving the combining gain, coding-block-based HARQ combining may also provide fast decoding and reduced power consumption because coding blocks that have passed need not be decoded again during the next HARQ reception.

Certain embodiments of HARQ combining on a coding block basis may employ a single HARQ combiner or select between multiple HARQ combiners, as described above for S-HARQ combining. The HARQ combiner(s) may be coupled to one common HARQ buffer or multiple HARQ buffers and a HARQ controller that controls the HARQ combiner(s) and buffer(s) based on the status of each coding block 1106 of each HARQ channel. Each coding block 1106 may be coded independently, even coding blocks of a particular HARQ channel.

Figure 12:
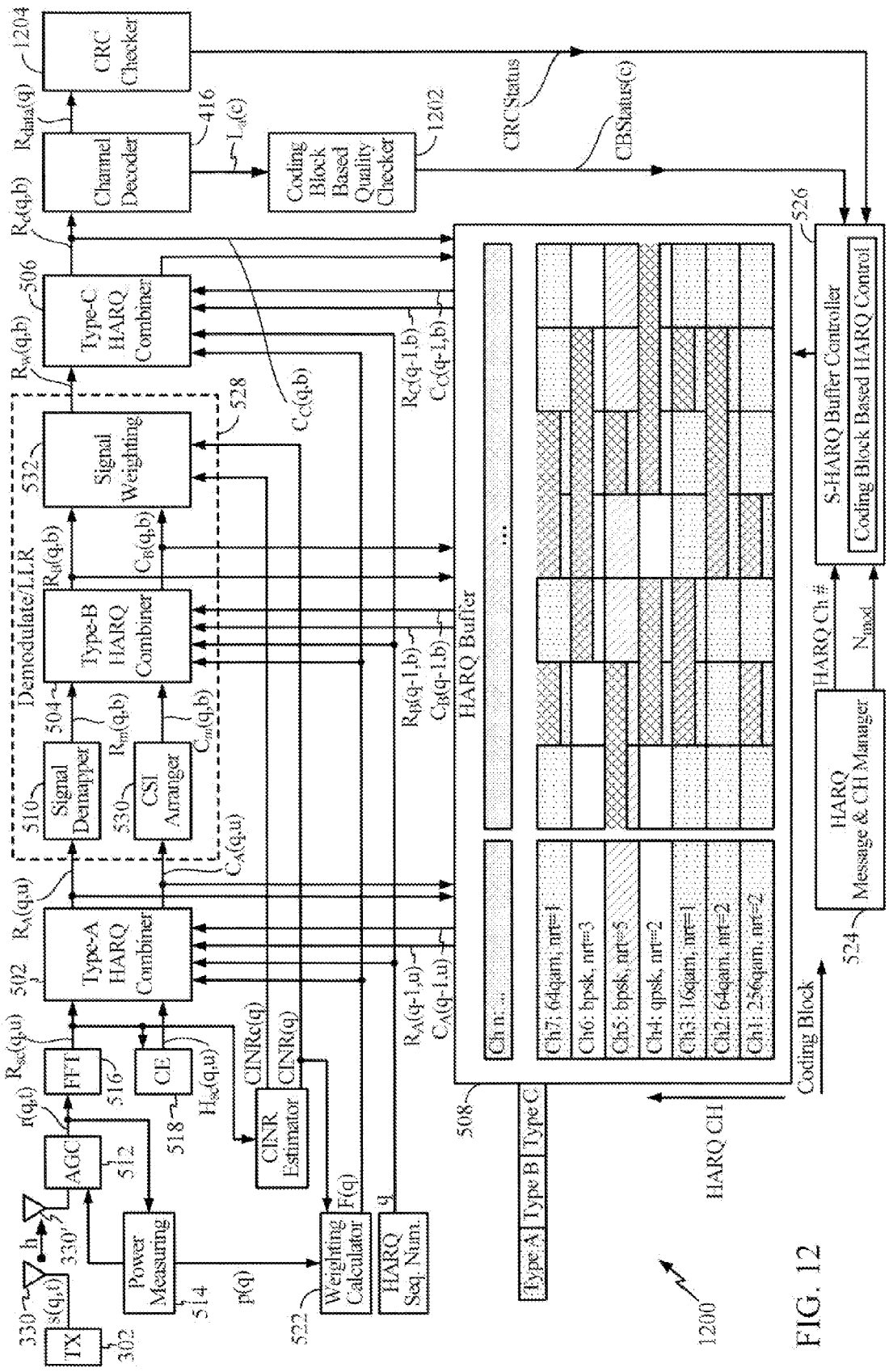
FIG. 12 is a block diagram of a receiver for S-HARQ combining based on coding blocks, in accordance with certain embodiments of the present disclosure.

FIG. 12 is a block diagram 1200 of a receiver for coding-block-based HARQ combining with multiple combiners located at different processing stages capable of performing S-HARQ combining, similar to the block diagram of FIG. 5. Different embodiments may have different combinations of different types of combiners at different processing stages. In the illustrated embodiment, the receiver includes a Type A combiner 502, a Type B combiner 504, a Type C combiner 506, and a single HARQ buffer 508 common to all three combiners. In the illustrated example, the Type A combiner 502 is positioned before the signal demapper 510, while the Type B combiner 504 is positioned after the signal demapper 510. The Type C combiner 506 may be positioned before the channel decoder 416.

In addition to the components described above for the block diagram 500 of FIG. 5, the block diagram 1200 of FIG. 12 adds a coding-block-based quality checker 1202 and a CRC checker 1204. For a given HARQ channel, each coding block 1106 may be decoded independently. For each coding block 1106, the channel decoder 416 may output the accumulated likelihood (or accumulated distance) $L_a(c)$, where c is the coding block number, to the coding-block-based quality checker 1202. The coding-block-based quality checker 1202 may determine the coding block status CBstatus(c) for each coding block c and output this information to the S-HARQ buffer controller 526. For some embodiments, the quality checker 1202 or the buffer controller 526 may consider other factors described above, such as the CSI and/or the coding rate, when determining whether each coding block 1106 should be saved for combining and may update CBstatus(c) for each coding block c accordingly. The channel decoder 416 may also output the decoded HARQ message $R_{data}(q)$ for the $q^{th}$ iteration to the CRC checker 1204. The CRC checker 1204 may determine whether the decoded HARQ message is correct and output CRCstatus to the S-HARQ buffer controller 526.

Figure 13:
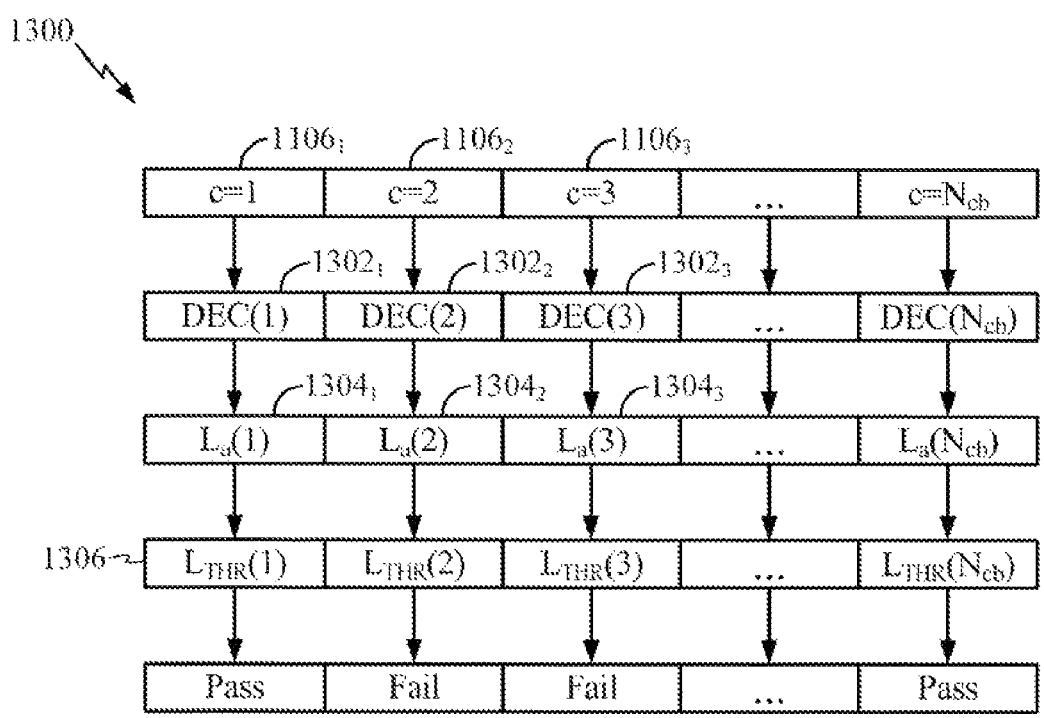
FIG. 13 illustrates a decoding quality check for coding-block-based HARQ combining, in accordance with certain embodiments of the present disclosure.

FIG. 13 illustrates an example process 1300 of quality checking after decoding to determine the CBstatus(c). For each decoded coding block DEC(c) 1302, the channel decoder 416 may output the accumulated likelihood $L_a(c)$ 1304 as described above. If the CRC of the HARQ channel has failed (i.e., CRCstatus='Fail'), then each accumulated likelihood $L_a(c)$ 1304 may be normalized by the length of the corresponding coding block c and may be compared with a normalized threshold $L_{THR}$ 1306. If $L_a(c)$ is greater than threshold $L_{THR}$ 1306, then the coding-block-based quality checker 1202 may output CBstatus(c)='Pass' for coding block c, meaning the decoded message for that coding block 1106 is correct. Otherwise, the coding-block-based quality checker 1202 may output CBstatus(c)='Fail' for coding block c, meaning the decoded message for that coding block 1106 is incorrect. The likelihood threshold $L_{THR}$ 1306 may be determined based on a system operating point during system design as a priori information.

Referring back to FIG. 12, for a given HARQ channel, the HARQ channel may be removed from the HARQ buffer 508 if CRCstatus='Pass' indicating that the decoded message is correct. However, if CRCstatus='Fail,' the S-HARQ buffer controller 526 may perform coding-block-based HARQ buffer control. The buffer controller 526 may check the coding block status for each coding block 1106 CBstatus(c). If CBstatus(c)='Fail' for a particular coding block 1106, then the soft bits of the HARQ combined signal from the selected type of HARQ combiner may be saved for that coding block.

However, if CBstatus(c)='Pass' for a particular coding block 1106, the decoded bits of that coding block are saved into the HARQ buffer 508 instead of the more numerous soft bits, and that coding block need not be decoded again in subsequent HARQ receptions. By doing so, the coding-block-based HARQ combining scheme may reduce memory, provide fast decoding, and reduce power consumption. The successfully decoded coding blocks for a certain HARQ channel are illustrated in the HARQ buffer 508 of FIG. 12 by the reduced height of the allocated storage space compared to other coding blocks in the remainder of the HARQ channel, which require substantially more space to store the soft bits of the HARQ combined signals.

Reduced memory, or HARQ buffer size, arises because memory requirements between uncoded (i.e., decoded) and coded cases are generally very different. For example, with a coding rate r=½ and BPSK modulation, memory requirements of Type A, B, and C HARQ combiners 502, 504, 506 are 96 bits, 48 bits, and 16 bits, respectively. However, the memory requirement for the decoded case is just a single bit. As another example, with a coding rate r=¾ and 16-QAM modulation, memory requirements of Type A, B, and C HARQ combiners 502, 504, 506 are 16 bits, 20 bits, and 10.5 bits, respectively, while the decoded case is again just 1 bit. Therefore, memory requirement may be significantly reduced by saving decoded bits instead of coded soft bits.

Figure 14:
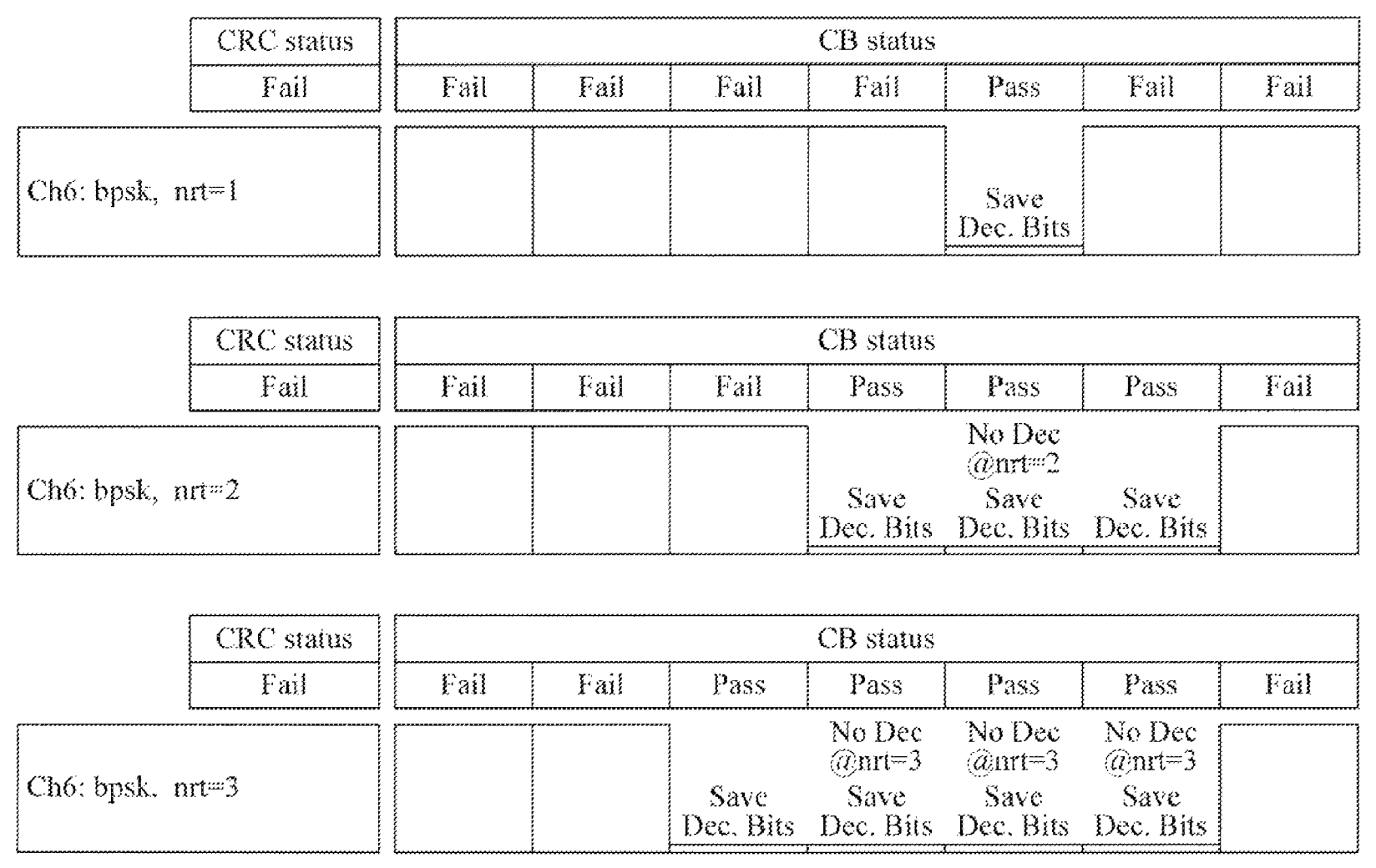

FIG. 14 illustrates contents of the HARQ buffer 508 during example iterations of coding-block-based HARQ combining. During the first HARQ reception, the CRC status indicates the decoded HARQ message is incorrect (CRCstatus='Fail'). The $5^{th}$ coding block has passed (CBstatus(5)='Pass') the criteria, so the decoded bits of the $5^{th}$ coding block are saved in the HARQ buffer 508, while the HARQ combined signals are saved to the other failing coding blocks.

After the second retransmission, the CRC status still indicates the decoded HARQ message is incorrect. The $4^{th}$ and $6^{th}$ coding blocks have passed (CBstatus(4), CBstatus(6) ='Pass'), so the decoded bits of the $4^{th}$ and $6^{th}$ coding blocks are saved to the HARQ buffer 508. The decoded bits of the $4^{th}$ and $6^{th}$ coding blocks may replace the HARQ combined signal data that was stored in the HARQ buffer 508 for these two coding blocks from previous HARQ transmissions. The $5^{th}$ coding block is not decoded again, thereby leading to faster decoding and reduced power consumption. During the third iteration, the CRC status still indicates the decoded HARQ message is incorrect, but the $3^{rd}$ coding block has passed (CBstatus(3)='Pass') the criteria. Therefore, the decoded bits of the $3^{rd}$ coding block are saved to the HARQ buffer 508, as shown in FIGS. 12 and 14 for HARQ channel 6 (Ch6).

Figure 15:
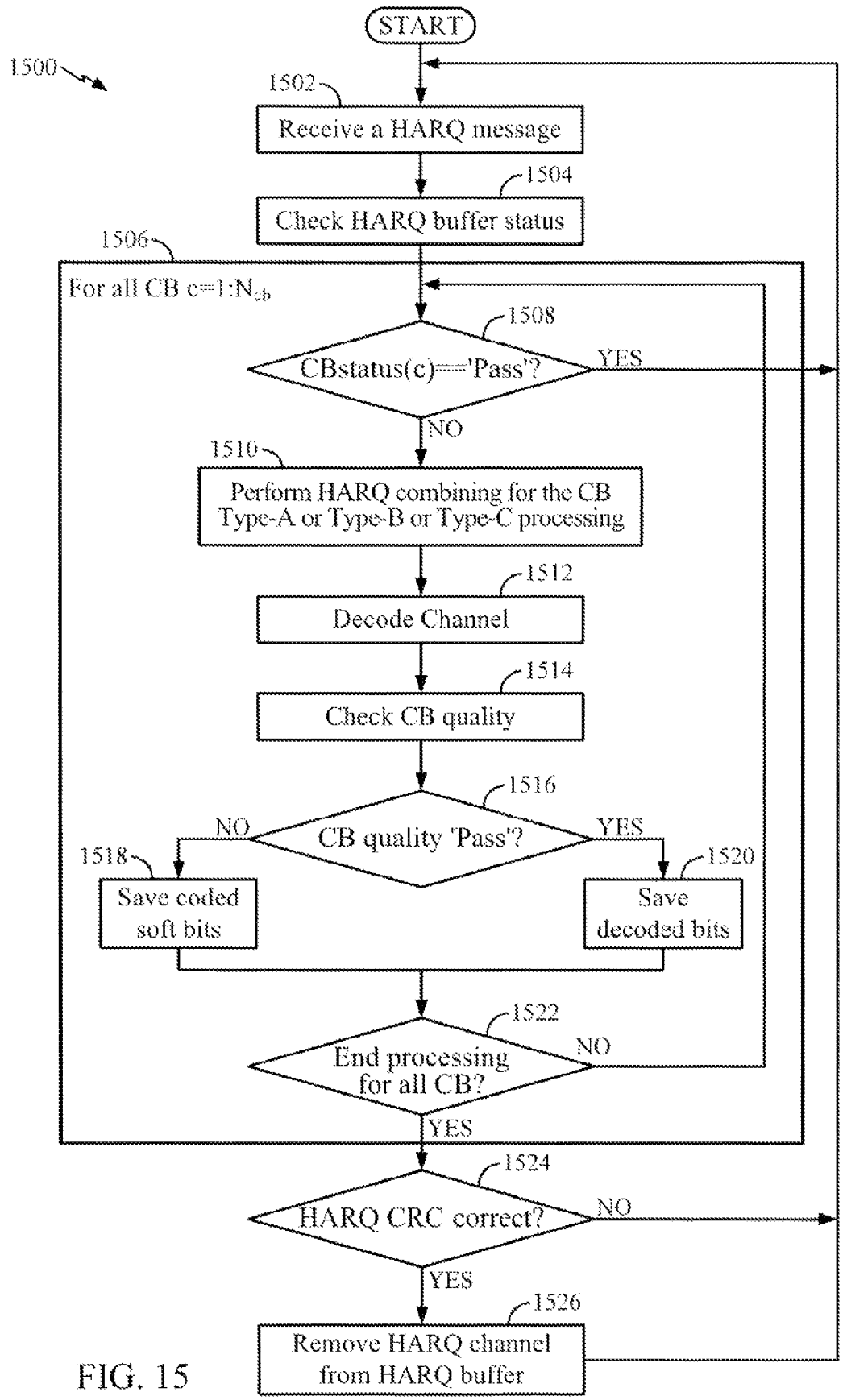
FIG. 15 is a flow diagram of example operations for HARQ combining based on coding blocks, in accordance with certain embodiments of the present disclosure.

FIG. 15 illustrates a flow diagram of example operations 1500 for coding-block-based HARQ combining. The operations begin, at 1502, by receiving a HARQ message through a certain wireless channel. At 1504, the status of the HARQ buffer 508 may be checked. If the receiver includes features for selective HARQ combining, then the buffer status may be checked in an effort to determine the headroom and select the appropriate type of HARQ combiner.

At 1506, a series of operations may be performed for all coding blocks (c=1:$N_{cb}$) in the HARQ channel. The status of a certain coding block c may be checked at 1508, and if CBstatus(c)='Pass,' then another coding block may be checked at 1508. If CBstatus(c)≠'Pass,' then HARQ combining for the coding block c may be performed at 1510. HARQ combining may occur, for example, before signal demapping, after signal demapping, or before channel decoding as described above. At 1512, the HARQ combined signal may be decoded by the channel decoder 416, for example, and the coding block quality may be checked at 1514.

If the coding block quality does not pass, (e.g., is less than or equal to the likelihood threshold or greater than or equal to the distance threshold, perhaps in view of other parameters as described above) at 1516, then the coded soft bits may be saved for that particular coding block at 1518. If the coding block quality passes (e.g., is greater than the likelihood threshold or less than the distance threshold), then the decoded bits may be saved for that particular coding block at 1520.

After the coded soft bits or decoded bits have been saved to the HARQ buffer 508, a determination may be made whether all of the coding blocks c=1:$N_{cb}$ have been processed at 1522 for the operations of 1506. If not all of the coding blocks have been processed, then the processing operations of 1506 may be repeated starting with 1508. If the processing operations of 1506 are to be ended at 1522, then the HARQ CRC may be checked at 1524.

If the designated bits of the HARQ message 1100 are correct, then the message may be interpreted to be successfully transmitted and received. The particular HARQ channel may be removed from the HARQ buffer 508 at 1526, and the operations may repeat with the reception of a new HARQ message from a different wireless channel at 1502. However, if any of the designated bits of the HARQ message are incorrect, the receiver 304 may send a request to the transmitter 302 for a retransmission of the HARQ message 1100 as described above, and the operations may repeat beginning with 1502 for the same channel. During the next HARQ iteration for the same channel, the coding blocks 1106 having decoded bits stored in the HARQ buffer 508 need not be decoded again, thereby saving time and power consumption.

Figure 16:
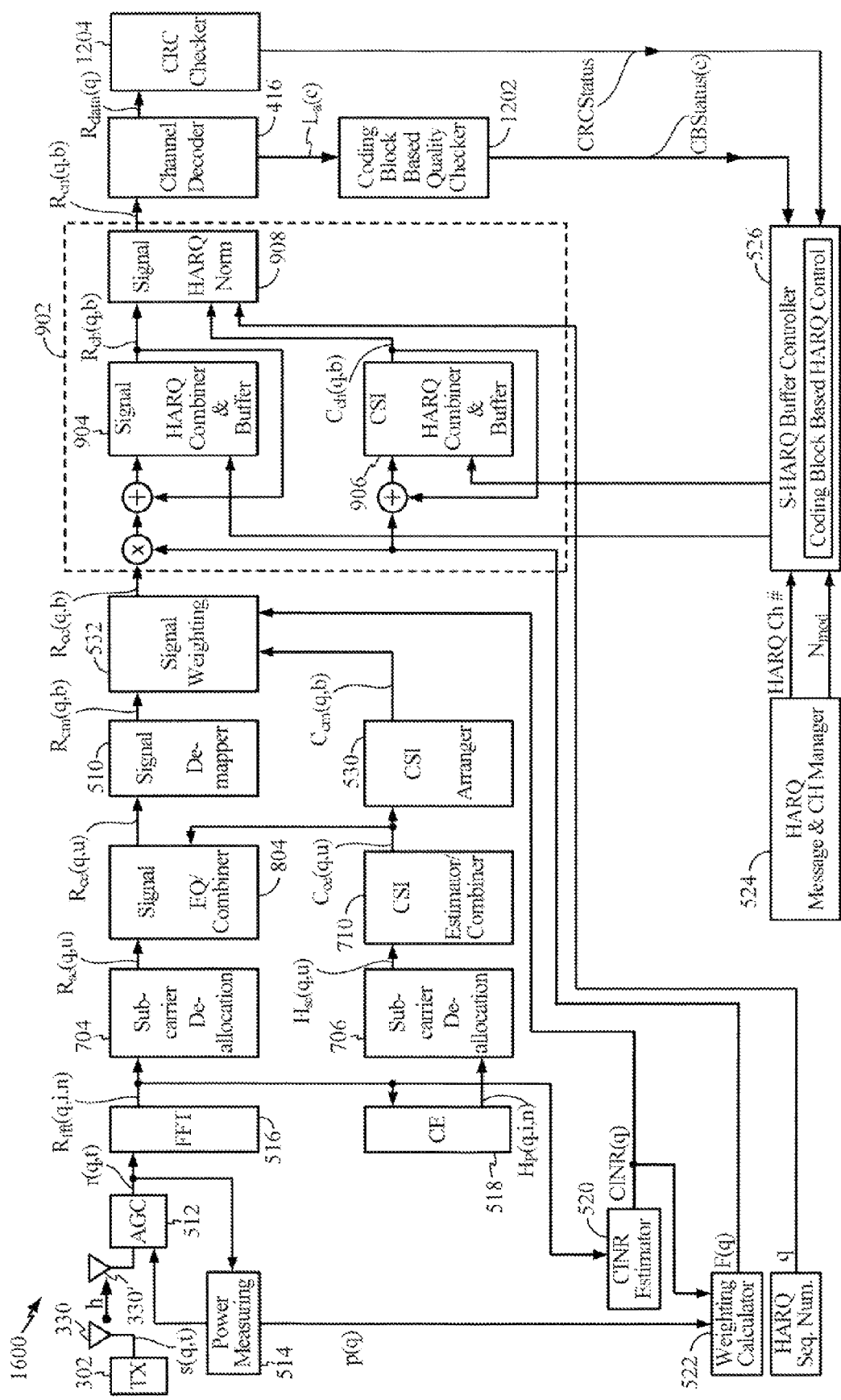
FIG. 16 illustrates one example of the receiver of FIG. 10 for HARQ combining before channel decoding based on coding blocks, in accordance with certain embodiments of the present disclosure.

Referring now to the block diagram 1600 of FIG. 16, some embodiments of receivers utilizing coding-block-based HARQ combining may have only a single HARQ combiner rather than multiple types of HARQ combiners. For example, the coding-block-based quality checker 1202, CRC checker 1204, and coding-block-based HARQ control in the buffer controller 526 may be added to the fixed Type C HARQ combiner of FIG. 10, as illustrated in FIG. 16. Other embodiments may use a fixed Type A or B HARQ combiner. No matter which type of HARQ combiner is selected, the techniques of the coding-block-based HARQ combining scheme may be applied as described above.

An Overview of Coding Block Based HARQ Combining

Figure 17:
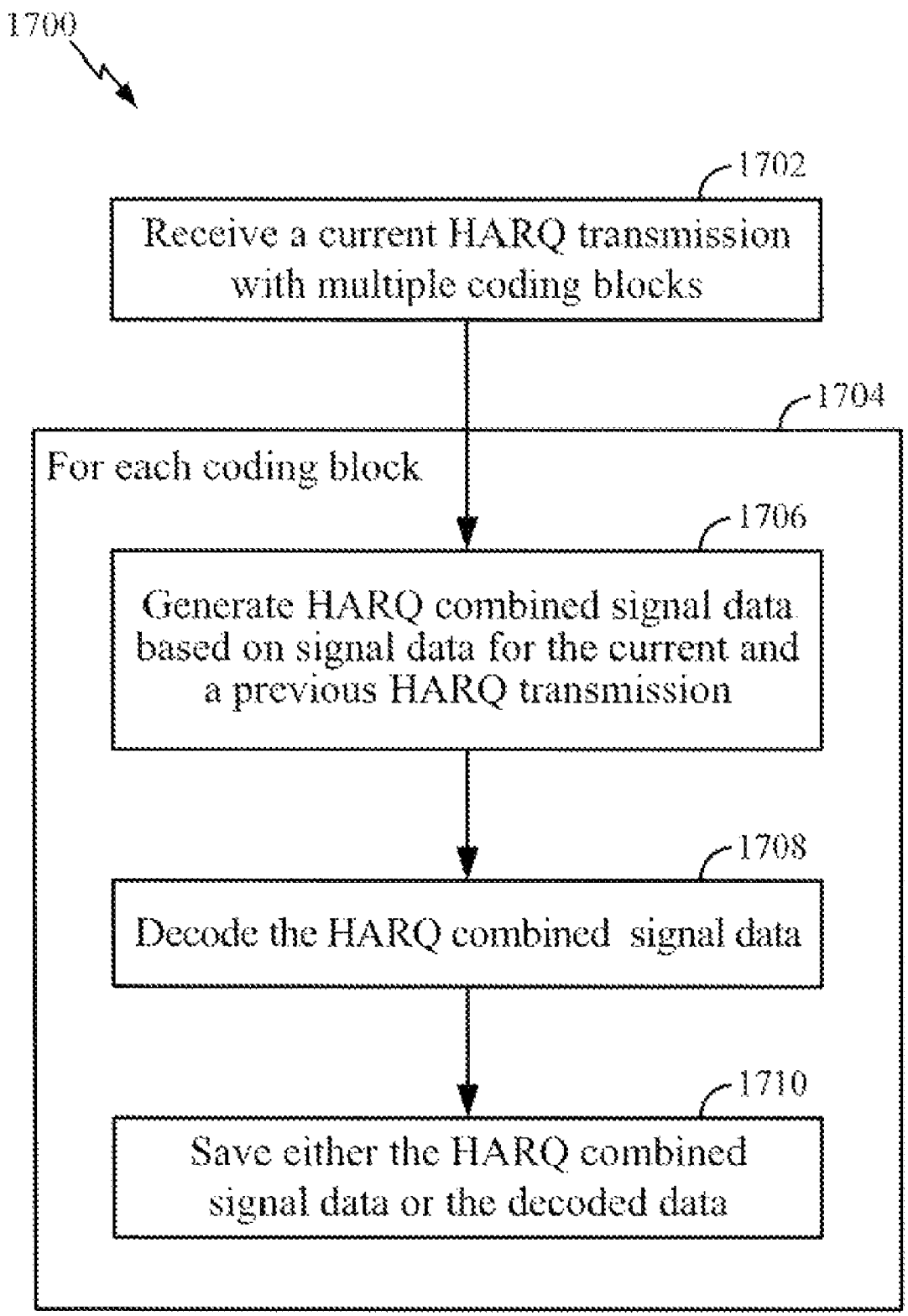
FIG. 17 is a flow diagram of example operations for coding-block-based HARQ combining, in accordance with certain embodiments of the present disclosure.

FIG. 17 illustrates a flow diagram of example operations 1700 for coding-block-based HARQ combining. The operations may begin, at 1702, by receiving a HARQ message through a certain wireless channel. The HARQ message may include a plurality of coding blocks as described above.

At 1704, a series of operations may be performed for all coding blocks in the HARQ channel. For each coding block, HARQ combining may occur at step 1706 in an effort to generate HARQ combined signal data based on signal data from the current HARQ transmission and a previous HARQ transmission having an incorrect decoded message. At 1708, the HARQ combined signal data may be decoded for each coding block. Based on a selection criterion as described above, either the HARQ combined signal data or the decoded data may be saved for each coding block at 1710.

Figure 17A:
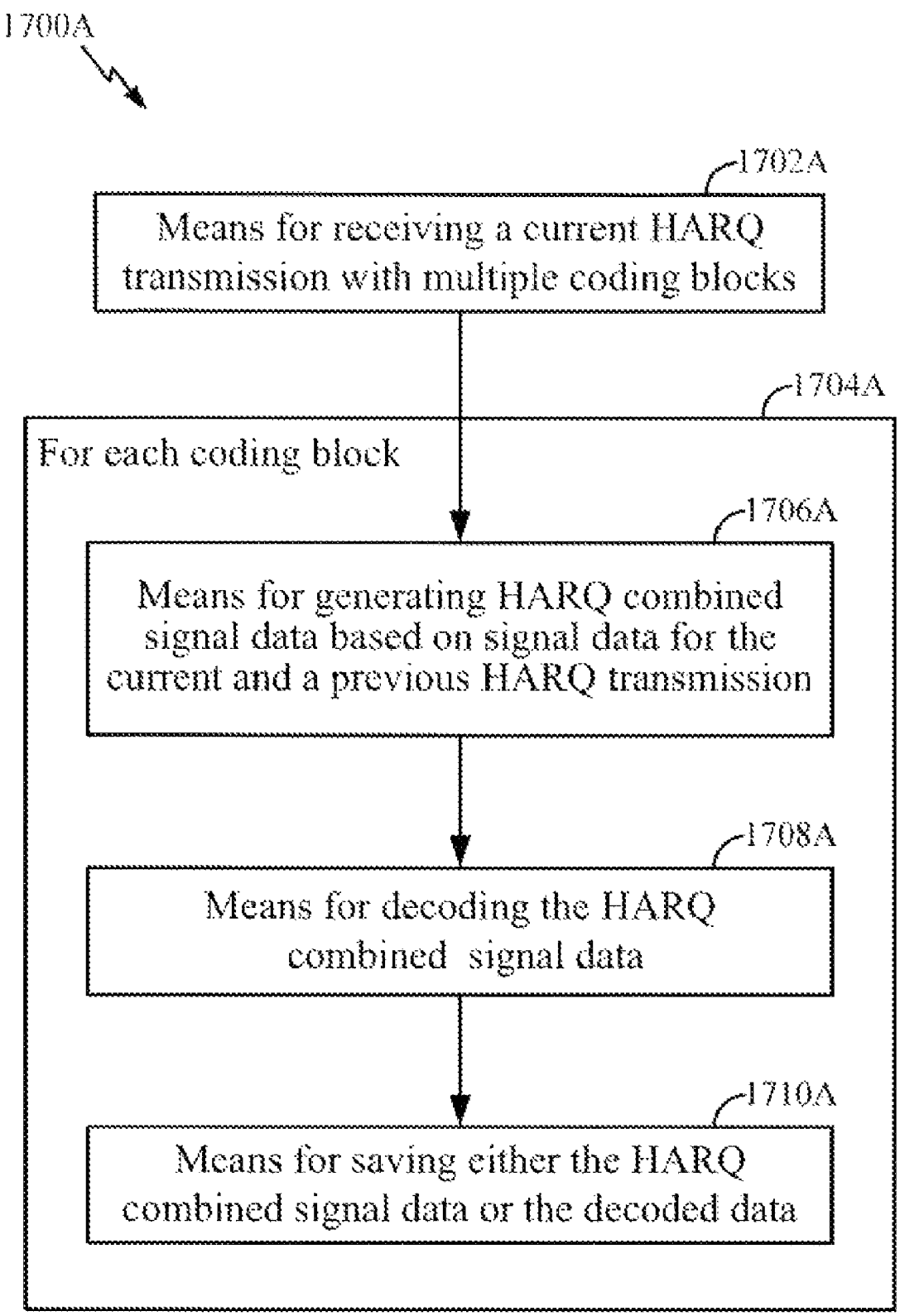
FIG. 17A is a block diagram of means corresponding to the example operations for the coding-block-based HARQ combining of FIG. 17, in accordance with certain embodiments of the present disclosure.

The method 1700 of FIG. 17 described above may be performed by various hardware and/or software component (s) and/or module(s) (e.g., code, instructions, etc.) corresponding to the means-plus-function blocks 1700A illustrated in FIG. 17A. In other words, blocks 1702 through 1710 illustrated in FIG. 17 correspond to means-plus-function blocks 1702A through 1710A illustrated in FIG. 17A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module (i.e., the code, instructions, etc.) may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction or code, or many instructions or strings/sets of code, and may be distributed over several different code segments or instruction sets, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 7, 13A-B, 16A-B and 17(A), can be downloaded and/or otherwise obtained by a user terminal and/or base station as applicable. For example, such a device can be coupled to a server to facilitate the transfer of means for performing the methods described herein. Alternatively, various methods described herein can be provided via a storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A receiver for wireless communication with a hybrid automatic repeat-request (HARQ) mechanism, comprising:
at least one buffer for storing data for a previously received HARQ transmission divided into a plurality of coding blocks and having an incorrect decoded message, the data for each of the plurality of coding blocks being HARQ combined signal data or decoded bits;
at least one combiner configured to generate the HARQ combined signal data for each coding block based on signal data for a current HARQ transmission and signal data for the previously received HARQ transmission;
a decoder configured to produce decoded bits for each coding block based on the HARQ combined signal data; and
control logic configured to select between saving the HARQ combined signal data or the decoded bits for each coding block to the at least one buffer based on a selection criterion, wherein the selection criterion comprises saving the decoded bits when the decoded bits are correctly decoded and saving the HARQ combined signal data when the decoded bits are incorrectly decoded, wherein the at least one combiner comprises a first combiner at a first location and a second combiner at a second location downstream of the first location along a reception processing path and the control logic is configured to select between one of the first and second combiners to generate the HARQ combined signal data.

2. The receiver of claim 1, wherein the selection criterion further comprises an accumulated likelihood for each coding block.

3. The receiver of claim 2, wherein the control logic is configured to save the decoded bits for at least one of the plurality of coding blocks when the accumulated likelihood for the at least one of the plurality of coding blocks is greater than a threshold likelihood.

4. The receiver of claim 1, wherein the decoded bits replace HARQ combined signal data from the previously received HARQ transmission when saved to the at least one buffer.

5. The receiver of claim 1, wherein the at least one combiner is configured to generate the HARQ combined signal data using Chase combining.

6. An apparatus for wireless communication with a hybrid automatic repeat-request (HARQ) mechanism, comprising:
means for storing data for a previously received HARQ transmission divided into a plurality of coding blocks and having an incorrect decoded message, the data for each of the plurality of coding blocks being HARQ combined signal data or decoded data;
first means for generating the HARQ combined signal data for each coding block at a first location along a reception processing path, the HARQ combined signal data based on signal data for a current HARQ transmission and signal data for the previously received HARQ transmission;
second means for generating the HARQ combined signal data at a second location along the reception processing path downstream of the first location;
means for producing the decoded data for each coding block based on the HARQ combined signal data; and
means for selecting between storing the HARQ combined signal data or the decoded data for each coding block to the means for storing data based on a selection criterion, wherein the selection criterion comprises saving the decoded data when the decoded data is correctly decoded and saving the HARQ combined signal data when the decoded data is incorrectly decoded, wherein the means for selecting is configured to select one of the first and second means for generating the HARQ combined signal data.

7. The apparatus of claim 6, wherein the selection criterion further comprises an accumulated distance for each coding block.

8. The apparatus of claim 7, wherein the means for selecting is configured to store the decoded data for at least one of the plurality of coding blocks when the accumulated distance for the at least one of the plurality of coding blocks is less than a threshold distance.

9. An apparatus for wireless communication with a hybrid automatic repeat-request (HARQ) mechanism, the apparatus comprising a processor coupled to a memory, the memory storing program codes executable by the processor for performing the following:
receiving a current HARQ transmission having a plurality of coding blocks;
generating HARQ combined signal data for each coding block based on signal data for the current HARQ transmission and signal data for a previously received HARQ transmission having an incorrect decoded message at a first location along a reception processing path;
generating the HARQ combined signal data at a second location along the reception processing path downstream of the first location;
decoding the HARQ combined signal data for each coding block; and
for each coding block, saving either the HARQ combined signal data or the decoded data based on a selection criterion, wherein the selection criterion comprises saving the decoded data when the decoded data is correctly decoded and saving the HARQ combined signal data when the decoded data is incorrectly decoded, and wherein the selection criterion comprises selecting one of the first and second locations for generating the HARQ combined signal data.

10. The apparatus of claim 9, wherein the selection criterion further comprises an accumulated distance for each coding block.

11. The apparatus of claim 10, wherein the decoded data is saved for at least one of the plurality of coding blocks when the accumulated distance for the at least one of the plurality of coding blocks is less than a threshold distance.

12. A computer-program product for processing data for wireless communication with a hybrid automatic repeat-request (HARQ) mechanism comprising a computer readable medium having a set of instructions stored thereon, the set of instructions being executable by one or more processors and the set of instructions comprising:
instructions for storing data for a previously received HARQ transmission divided into a plurality of coding blocks and having an incorrect decoded message, the data for each of the plurality of coding blocks being HARQ combined signal data or decoded data;
first instructions for generating the HARQ combined signal data for each coding block at a first location along a reception processing path, the HARQ combined signal data based on signal data for a current HARQ transmission and signal data for the previously received HARQ transmission;
second instructions for generating the HARQ combined signal data at a second location along the reception processing path downstream of the first location;
instructions for producing the decoded data for each coding block based on the HARQ combined signal data; and
instructions for selecting between storing the HARQ combined signal data or the decoded data for each coding block to the instructions for storing data based on a selection criterion, wherein the selection criterion comprises saving the decoded data when the decoded data is correctly decoded and saving the HARQ combined signal data when the decoded data is incorrectly decoded, and wherein the instructions for selecting are configured to select one of the first and second instructions for generating the HARQ combined signal data.

13. The computer-program product of claim 12, wherein the selection criterion further comprises an accumulated distance for each coding block.

14. The computer-program product of claim 13, wherein the instructions for selecting is configured to store the decoded data for at least one of the plurality of coding blocks when the accumulated distance for the at least one of the plurality of coding blocks is less than a threshold distance.

15. A mobile device, comprising:
a receiver front end for receiving a current hybrid automatic repeat-request (HARQ) transmission;
at least one buffer for storing data for a previously received HARQ transmission divided into a plurality of coding blocks and having an incorrect decoded message, the data for each of the plurality of coding blocks being HARQ combined signal data or decoded bits;
at least one combiner configured to generate the HARQ combined signal data for each coding block based on signal data for the current and the previously received HARQ transmissions;
a decoder configured to produce the decoded bits for each coding block based on the HARQ combined signal data; and
control logic configured to select between saving the HARQ combined signal data or the decoded bits for each coding block to the at least one buffer based on a selection criterion, wherein the selection criterion comprises saving the decoded bits when the decoded bits are correctly decoded and saving the HARQ combined signal data when the decoded bits are incorrectly decoded, wherein the at least one combiner comprises a first combiner at a first location and a second combiner at a second location downstream of the first location along a reception processing path and the control logic is configured to select between one of the first and second combiners to generate the HARQ combined signal data.

16. The mobile device of claim 15, wherein the selection criterion further comprises an accumulated likelihood for each coding block.

17. A method for interpreting hybrid automatic repeat-request (HARQ) transmissions in a wireless communication system, the method comprising:
using an antenna for receiving a current HARQ transmission having a plurality of coding blocks;
generating HARQ combined signal data for each coding block based on signal data for the current HARQ transmission and signal data for a previously received HARQ transmission having an incorrect decoded message;
decoding the HARQ combined signal data for each coding block; and
for each coding block, saving either the HARQ combined signal data or the decoded data based on a selection criterion, wherein the selection criterion comprises saving the decoded data when the decoded data is correctly decoded and saving the HARQ combined signal data when the decoded data is incorrectly decoded, and wherein the selection criterion is configured to select one of a first combiner at a first location and second combiner at a second location downstream of the first location along a reception processing path to generate the HARQ combined signal data.

18. The method of claim 17, wherein the selection criterion further comprises an accumulated likelihood for each coding block.

19. The method of claim 18, wherein the decoded data is saved for at least one of the plurality of coding blocks when the accumulated likelihood for the at least one of the plurality of coding blocks is greater than a threshold likelihood.

20. The method of claim 17, wherein saving the decoded data replaces HARQ combined signal data from the previously received HARQ transmission.

21. The method of claim 17, wherein generating HARQ combined signal data for each coding block comprises selecting one of first and second combiners for use in generating the HARQ combined signal data for each coding block, wherein the second combiner is located downstream of the first combiner along a reception processing path.

22. The method of claim 17, wherein the current HARQ transmission is received in a channel and wherein saving either the HARQ combined signal data or the decoded data is based on the modulation order of the channel, the coding rate, the channel state information (CSI), the channel quality, the number of the current HARQ transmission, or any combination thereof.

* * * * *